US012470412B2

(12) United States Patent
Lindskog et al.

(10) Patent No.: US 12,470,412 B2
(45) Date of Patent: Nov. 11, 2025

(54) STORAGE DEVICE UTILIZING PHYSICALLY UNCLONABLE FUNCTION (PUF) BASED SECRET SHARING SCHEME FOR DATA ENCRYPTION/DECRYPTION

(71) Applicant: TELEFONAKTIEBOLAGET L M ERICSSON (PUBL), Stockholm (SE)

(72) Inventors: Niklas Lindskog, Lund (SE); Håkan Englund, Lund (SE)

(73) Assignee: TELEFONAKTIEBOLAGET L M ERICSSON (PUBL), Stockholm (SE)

( * ) Notice: Subject to any disclaimer, the term of this patent is extended or adjusted under 35 U.S.C. 154(b) by 160 days.

(21) Appl. No.: 18/567,722

(22) PCT Filed: Jun. 7, 2021

(86) PCT No.: PCT/IB2021/054991
§ 371 (c)(1),
(2) Date: Dec. 6, 2023

(87) PCT Pub. No.: WO2022/259015
PCT Pub. Date: Dec. 15, 2022

(65) Prior Publication Data
US 2024/0214225 A1    Jun. 27, 2024

(51) Int. Cl.
H04L 9/32        (2006.01)
G06F 21/78       (2013.01)
H04L 9/08        (2006.01)

(52) U.S. Cl.
CPC ............ H04L 9/3278 (2013.01); G06F 21/78 (2013.01); H04L 9/085 (2013.01)

(58) Field of Classification Search
CPC ..... H04L 9/3278; H04L 9/085; H04L 9/0822; H04L 9/0866; H04L 9/0894; H04L 9/14; G06F 21/78; G06F 21/30; G06F 21/62
See application file for complete search history.

(56) References Cited

U.S. PATENT DOCUMENTS

2010/0199103 A1*  8/2010  Van Rijnswou ...... H04L 9/0866
                                                    713/189
2011/0138475 A1*  6/2011  Gordon ................. H04L 9/0897
                                                    726/26
(Continued)

FOREIGN PATENT DOCUMENTS

CN            110233729 A        9/2019

OTHER PUBLICATIONS

Trusted Computing Group, et al. "Trusted Computing Group and NVMe Work Group Joint White Paper: TCG Storage, Opal, and NVMe", Aug. 2015.

*Primary Examiner* — J. Brant Murphy
(74) *Attorney, Agent, or Firm* — Ericsson Inc.

(57) ABSTRACT

Systems and methods are disclosed herein for protecting data in a storage device by encrypting or decrypting the data with a Data Encryption Key (DEK). The storage device is communicatively coupled to a host and is locked with the host by secret sharing. In one example, the storage device comprises a Physically Unclonable Function (PUF) configured to, during a key generation phase of operation, generate a set of DEK responses based on a set of DEK challenges (chalDEK) and an assembler configured to obtain a set of SED DEK secret shares ($SS_{SED}$) based on the first set of DEK responses, receive additional data, and assemble at least the set of SED DEK secret shares ($SS_{SED}$) and the additional data to create a DEK master secret. The storage device also comprises a crypto module configured to receive a DEK based on the master secret and perform encryption and/or decryption of data using the DEK.

20 Claims, 16 Drawing Sheets

(56) References Cited

U.S. PATENT DOCUMENTS

| | | | |
|---|---|---|---|
| 2014/0006806 A1* | 1/2014 | Corella | G06F 21/62 |
| | | | 713/193 |
| 2014/0032933 A1* | 1/2014 | Smith | G06F 21/31 |
| | | | 713/193 |
| 2017/0279606 A1* | 9/2017 | Kara-Ivanov | G09C 1/00 |
| 2019/0190726 A1* | 6/2019 | Wallrabenstein | H04L 9/3278 |
| 2020/0053061 A1* | 2/2020 | Cambou | H04L 63/0457 |
| 2020/0358600 A1* | 11/2020 | Xu | H04L 63/12 |
| 2021/0258174 A1* | 8/2021 | Schoinianakis | G06F 21/602 |
| 2024/0072996 A1* | 2/2024 | Webb | H04L 9/0838 |

* cited by examiner

STORAGE DEVICE UTILIZING PHYSICALLY UNCLONABLE FUNCTION (PUF) BASED SECRET SHARING SCHEME FOR DATA ENCRYPTION/DECRYPTION

This application is a 371 of International Application No. PCT/IB2021/054991, filed on Jun. 7, 2021, the disclosure of which is fully incorporated herein by reference.

TECHNICAL FIELD

The present disclosure relates to a secure storage device and, more specifically, to a secure storage device that utilizes a Physically Unclonable Function (PUF) for generation of secret shares.

BACKGROUND

Physically Unclonable Functions (PUFs)

Physically Unclonable Functions (PUFs) are circuits, components, processes, or other entities capable of generating an output, such as a key, a digital identity, or authentication data. A PUF should be resistant to cloning. For example, a device having a PUF would be difficult to clone, as it is ideally infeasible to model the PUF and precisely recreate it on another device.

PUFs are used to create a unique response by using implicit or explicit randomness. This response can be used for cryptographic or device identity purposes. Implicit randomness may include unpredictable manufacturing differences in semiconductor devices that can be exploited to create a device-unique response. On the other hand, explicit randomness means that the introduction of randomness requires extra steps during manufacturing or a later stage, e.g., at packaging.

A PUF comprises one or several subfunctions, sometimes called elements or components, which each contributes a part of the PUF response. One example of the subfunctions of a PUF, is a ring-oscillator pair. A ring oscillator is formed by an uneven number of signal inverters in a ring, where gate delay propagation is used as a randomness source. The PUF response is based on a comparison between the two ring-oscillators where the number of oscillations at a given point is measured. In particular, the PUF response may be an identifier of the fastest ring oscillator or the slowest ring oscillator. Another example of the subfunctions of a PUF may be uninitialized Static Random Access Memory (SRAM) cells, which have two possible states (0 and 1). Prior to power-up, the SRAM cell is in neither state. At power-up, the SRAM cell stabilizes in one of the two states. The PUF response is the entered state of a set of SRAM cells. Yet another example is an arbiter. An arbiter might be regarded as a digital race condition between two or more signal paths on a chip where a so-called arbiter circuit identifies the winning signal. The paths might comprise several switch blocks, which can alter the signal paths. For example, the PUF response can be an identification of the winning signal. In some PUF entities, the same subfunction(s) might generate several outputs by utilizing different parts of the PUF challenge. Each subfunction also has the property that it is physically unclonable, i.e., unique for the device. A PUF may therefore comprise several subfunctions which can be used as independent PUFs, albeit with fewer possible challenges and fewer response bits.

The PUF response can be used to create a unique device identity or a device-unique key without having to store the key in, e.g., Battery Backup Random Access Memory (BBRAM) or One Time Programmable (OTP) memory. Hence, it is much harder for an attacker to mount certain types of hardware attacks with the goal of recovering the key from a device using a PUF.

There are several types of PUFs, but all PUFs accept a challenge as input. The PUFs generally translate the challenge into either (i) a selection of at least one element within the PUF or (ii) a configuration of at least one element within the PUF. Depending on what type of PUF is used, the number of challenges, which are accepted by the PUF, can vary from just one to an exponential amount related to the number of subfunctions. In the present disclosure, the challenge is considered to be an input to the PUF that creates a specified number of response bits. The present disclosure may include activating the PUF several times using different subsections of the challenge where each subsection generates at least one part of the response.

Most PUF types additionally require helper data to function properly, i.e., to increase the possibility of recreating the same response given the same challenge. Some PUF types can remap the challenge-response mapping one or several times, i.e., after the remapping, some or all challenges may result in new responses.

A reconfigurable PUF can alter the entire challenge space, e.g., to make sure that all challenges receive a new response. An erasable PUF is a PUF that has the possibility to change responses of specific challenges. Alternatively, the PUF might respond with a null sequence, for example, all zeros, for challenges marked as "erased." When a PUF response (or a derivation thereof) is used to encrypt another cryptographic key, the PUF response is called Key Encryption Key (KEK).

Self-Encrypting Drive (SED)

Encrypting digital information is essential for the protection of its confidentiality. Protection of data at rest is discussed in the present disclosure. Several solutions exist, i.e., with a granularity from encrypting files, containers, volumes, or entire disks. Encrypting the entire disk is called Full Disk Encryption (FDE), which may be performed both by a host using a software application and by a storage device, called a Self-Encrypting Drive (SED), using hardware. Throughout the present disclosure, the SED and the storage device are used interchangeably.

The SED is a term for a storage device that stores the data in encrypted form. The encryption happens seamlessly from the perspective of the host machine. The SED is popular because the SED does not increase a computation load on the main Central Processing Unit (CPU), while the software-based FDE does. The SED is potentially more resistant to cold boot and Direct Memory Access (DMA) attacks, where attackers can steal the encryption key from the computer's Random-Access Memory (RAM). Typically, the encryption itself is performed by a dedicated Advanced Encryption Standard (AES) accelerator on the SED.

The storage on an SED can generally be said to be divided into three regions, an administrative region, a credential storage region, and a data storage region. The data storage region may be divided into several ranges, sometimes called bands or sections. Each range may belong to a different user, but multiple users can also be configured to be able to unlock the same range independently.

In order to perform encryption on an SED, a Data Encryption Key (DEK), sometimes called a Media Encryption Key (MEK), is usually stored within a protected region of the drive. The DEK may be stored in cleartext, but to the best practice recommendation is to store the DEK in an encrypted form. If the key is in plaintext, the disk storage is encrypted but, after power-up, the disk storage functions as a normal disk from the perspective of a user. If the DEK is encrypted, the user must supply a password used to derive an Authentication Key (AK), sometimes called KEK, which decrypts the DEK. An SED may contain several DEKs encrypted with either the same or different passwords. Each DEK encrypts a specific range of the disk if the disk includes multiple ranges of data. If only one range exists, the DEK encrypts the entire data storage on the SED.

When the DEK(s) is stored in the SED in encrypted form, after the AK has decrypted the DEK(s), the decrypted DEK(s) are stored in a volatile memory during an operation of the SED, enabling the decrypted DEK(s) to be used by a crypto module when needed. If the DEK(s) are erased, e.g. due to a power cycle, the password used to create the AK must be re-entered.

Aspects of SEDs may be standardized by standardization bodies such as the Trusted Computing Group (TCG) Opal standard. The TCG Opal standard defines expected protocols and features of an SED, e.g., supporting the AES with 128-bit keys or 256-bit keys and being able to erase keys upon request. The TCG Opal standard is mainly aimed at integrated and cloud-based drives, albeit nothing in the TGC Opal standard prohibits other drives, e.g. Universal Serial Bus (USB) connected drives, from conforming with the TGC Opal standard. There also exists a subset of the TCG Opal standard, called TCG Opalite, that supports fewer users and only a single range.

Advanced Technology Attachment (ATA) security is another standard relevant for the SED. However, the ATA security does not define any cryptographic capabilities for the storage devices, only that passwords should be used to unlock the drive. The ATA security further allows "master passwords" (unless "master password capability—maximum" is used) that must be able to overrule all other passwords. Due to this restriction, no disk encryption keys may be derived from user passwords.

Secret Sharing

Secret sharing is a well-known cryptographic technique in which a secret is broken into multiple "secret shares" and the secret shares are distributed to multiple participants. The secret can only be reconstructed when at least some minimum number of the secret shares distributed to the multiple participants are brought back together. In other words, all n participants in the secret sharing scheme are given an individual secret share of the secret. The idea is that out of this group of n participants, at least t participants (but any t participants) need to cooperate to be able to derive the secret. Such a secret sharing scheme is denoted as a (t, n)-threshold secret sharing scheme. This type of secret sharing scheme has historically been important for use cases such as missile launch codes and encryption keys. Interest in a research area called Multi-Party Computation (MPC), which is based on secret sharing, has increased in recent years.

The most well-known and original version of secret sharing is the so-called Shamir secret sharing scheme. The basic property of the Shamir secret sharing scheme is that, for any curve of degree t−1, t points on that curve are needed to find the curve. There is only one such curve that fulfills all those points as long as they are unique. The curve can efficiently be derived from the points by Lagrange Interpolation. In cryptographic applications, the curve arithmetic is often done in a finite field. The Shamir secret sharing scheme can, on a high level, be summarized as a preparation phase and a reconstruction phase. In the preparation phase, a "dealer" selects a finite field Fp and prepares a random curve $f(x)=a_0+a_1x+ \ldots +a_{t-1}x^{t-1}$, where all the coefficients $a_0, a_1, \ldots, a_{t-1}$ are in the field Fp. The secret value, also called master secret, is typically represented by $a_0$, but may be represented by one or several of the coefficients. The dealer selects n random points on the curve and distributes one point to each participant. In the reconstruction phase, t (or more) participants share their points, and the curve is reconstructed using Lagrange Interpolation.

Another variant is Blakley's secret sharing scheme which is based on hyperplanes in a t-dimensional space represented by the equation $C_x$ mod p=y. Blakley's scheme relies on the fact that any t non-parallel (t−1)-dimensional hyperplanes intersect at one specific point. The secret can be encoded in one of the coordinates of this point, but, for security reasons, not in several of the coordinates. The point of intersection is denoted $(x_0, y_0, z_0)$, from which $c \equiv z_0-a_0x+b_0y+c_i$ (mod p) can be derived. The dealer generates random hyperplanes $(a_i, b_i)$, for each participant and derives corresponding $c_i$ as $a_ix_0+b_iy_0+z_0=c_i$ (mod p). Hence, for t participants, the reconstruction phase becomes a problem of inverting a matrix or solving a system of linear equations. As long as the determinant of the matrix is non-zero mod p, the matrix is invertible.

SUMMARY

Embodiments of a storage device utilizing a Physically Unclonable Function (PUF) based secret sharing scheme for data encryption and/or decryption and related methods are disclosed herein. In one embodiment, a storage device for protecting data comprises at least one PUF configured to, during a key generation phase of operation, generate a set of Data Encryption Key (DEK) responses based on a set of DEK challenges (chalDEK), an assembler configured to obtain a set of Self-Encrypting Drive (SED) DEK secret shares ($SS_{SED}$) based on the set of DEK responses generated by the at least one PUF, receive additional data, assemble at least the set of SED DEK secret shares ($SS_{SED}$) and the additional data to create a DEK master secret. The storage device also comprises a crypto module configured to obtain a DEK based on the DEK master secret and perform encryption of data to be stored in encrypted data storage of the storage device using the DEK and/or decryption of data being accessed by the host from the encrypted data storage of the storage device using the DEK.

The present disclosure uses at least one PUF to generate secret shares when needed, and there is no need to store secret shares on the storage device. Thus, an attacker cannot extract secret shares stored in a non-volatile memory, which makes the storage device more secure. Shares related to DEK generation will be denoted "DEK secret shares." Further, the present disclosure suggests a Proof-of-Possession (PoP) phase in which the storage device must prove, to the host, that the storage device possesses the at least one PUF before the host (or a user) exposes its shares to the storage device. Shares involved in the PoP protocol will be denoted "PoP secret shares." The presence of the PoP phase makes it very difficult for an attacker to extract the shares of the host or the user by attempting to impersonate the storage device.

In one embodiment, the storage device further comprises a Key Derivation Function (KDF) configured to, during the key generation phase of operation, obtain the DEK master secret from the assembler and generate the DEK based on the DEK master secret.

In one embodiment, at least one of the SED DEK secret shares ($SS_{SED}$) comprises a set of partial SED DEK secret shares ($PSS_{SED}$). In one embodiment, the set of partial SED DEK secret shares ($PSS_{SED}$) comprises at least a first set of partial SED DEK secret shares ($PSS_{1,SED}$) and a second set of partial SED DEK secret shares ($PSS_{2,SED}$) belonging to the SED. In one embodiment, the first set of partial SED DEK secret shares ($PSS_{1,SED}$) is based on at least one response in the set of DEK responses generated by the at least one PUF. In one embodiment, the second set of partial SED DEK secret shares ($PSS_{2,SED}$) is obtained from the storage device. In one embodiment, the additional data comprises (a) a set of host DEK secret shares belonging to the host ($SS_H$), (b) a set of user DEK secret shares belonging to a user ($SS_U$), or (c) both (a) and (b). In one embodiment, the storage device further comprises an error correction module configured to, during the key generation phase of operation, provide the set of SED DEK secret shares ($SS_{SED}$) based on the set of DEK responses generated by the at least one PUF and helper data.

In one embodiment, during a PoP phase of operation that is prior to the key generation phase of operation, the at least one PUF of the storage device is further configured to generate a set of PoP responses based on a set of PoP challenges ($chal_{PoP}$), and the assembler is further configured to receive first PoP data from the host, assemble the first PoP data with second PoP data that is based on the set of PoP responses generated by the at least one PUF to create a PoP master secret, and forward the PoP master secret to an authentication module of the host. In one embodiment, the storage device further comprises an error correction module configured to, during the PoP phase of operation, provide the second PoP data based on the set of PoP responses generated by the at least one PUF and helper data. In one embodiment, the first PoP data comprises at least a set of host PoP secret shares ($SS_{PoP,H}$) and the second PoP data comprises at least a set of SED PoP secret shares ($SS_{PoP,SED}$). In one embodiment, the first PoP data comprises at least a set of partial host PoP secret shares ($PSS_{PoP,H}$) and the second PoP data comprises at least a set of partial SED PoP secret shares ($PSS_{PoP,SED}$).

In one embodiment, the storage device further comprises a One-Way Function (OWF) configured to, during a PoP phase of operation that is prior to the key generation phase of operation, obtain a first input that is based on a set of DEK responses generated by the at least one PUF based on a set of DEK challenges and a number used once (nonce) input from the host, generate an DEK output based on the DEK input and the nonce input, and forward the DEK output to the host. In one embodiment, the storage device further comprises an error correction module configured to, during the PoP phase of operation, provide the first input to the OWF based on the set of PoP responses generated by the at least one PUF and helper data.

In one embodiment, the storage device further comprises a dealer configured to, during a registration phase of operation, obtain the set of SED DEK secret shares ($SS_{SED}$) based on the first set of DEK responses generated by the at least one PUF, generate the additional data, and provide the additional data to the host. In one embodiment, at least one of the SED DEK secret shares in the set of SED DEK secret shares ($SS_{SED}$) comprises a set of partial SED DEK secret shares. In one embodiment, the set of partial SED DEK secret shares ($PSS_{SED}$) comprises at least a first set of partial SED DEK secret shares ($PSS_{1,SED}$) and a second set of partial SED DEK secret shares ($PSS_{2,SED}$). In one embodiment, the first set of partial SED DEK secret shares ($PSS_{1,SED}$) is based on at least one response in the set of DEK responses. In one embodiment, the dealer is further configured to store the second set of partial SED DEK secret shares ($PSS_{2,SED}$) on the credential storage of the storage device. In one embodiment, the additional data comprises at least a set of host DEK secret shares ($SS_H$) and the dealer is further configured to provide the set of host DEK secret shares ($SS_H$) to the host. In one embodiment, the additional data comprises at least a set of user DEK secret shares ($SS_U$) and the dealer is further configured to provide the set of user DEK secret shares ($SS_U$) to a user. In one embodiment, the storage device further comprises an error correction module configured to provide the set of SED DEK secret shares ($SS_{SED}$) based on the set of DEK responses generated by the at least one PUF and helper data. In one embodiment, the dealer is additionally configured to obtain a set of SED PoP secret shares ($SS_{PoP,SED}$) based on a set of PoP responses of the PUF and provide the set of SED PoP secret shares ($SS_{PoP,SED}$) to the host. In one embodiment, the dealer is additionally configured to obtain a set of partial SED PoP secret shares ($PSS_{PoP,SED}$) based on a set of PoP responses of the at least one PUF and provide the set of partial SED PoP secret shares ($PSS_{PoP,SED}$) to the host.

Corresponding embodiments of a method implemented in a storage device are also disclosed. In one embodiment, a method performed by a storage device for protecting data in the storage device comprises, during a key generation phase of operation, generating, by at least one PUF, a set of DEK responses based on a set of DEK challenges, obtaining a set of SED DEK secret shares ($SS_{SED}$) based on the set of DEK responses, receiving additional data, assembling at least the set of SED DEK secret shares ($SS_{SED}$), obtaining a DEK based on the DEK master secret, and performing encryption of data to be stored in data storage of the storage device using a DEK, which is based on the DEK master secret, and/or decryption of data being accessed by the host from the encrypted data storage of the storage device using the DEK.

In one embodiment, the method further comprises, during the key generation phase of operation, generating the DEK based on the DEK master secret using a KDF. In one embodiment, at least one of the secret shares in the set of SED DEK secret shares ($SS_{SED}$) comprises a set of partial SED DEK secret shares. In one embodiment, the set of partial secret shares comprises at least a first set of SED DEK partial secret shares ($PSS_{1,SED}$) and a second set of SED DEK partial secret shares ($PSS_{2,SED}$). In one embodiment, the first set of partial SED DEK secret shares ($PSS_{1,SED}$) is based on at least one DEK response in the set of DEK responses. In one embodiment, the second set of partial SED DEK secret shares ($PSS_{2,SED}$) is stored on the credential storage of the storage device. In one embodiment, the additional data comprises (a) a set of host DEK secret shares belonging to the host ($SS_H$), (b) a set of user DEK secret shares belonging to a user ($SS_U$), or (c) both (a) and (b). In one embodiment, the method further comprises providing the set of SED DEK secret shares ($SS_{SED}$) based on the set of DEK responses generated by the at least one PUF and helper data.

In one embodiment, the method further comprises, during a PoP phase of operation that is prior to the key generation phase of operation, generating, by the at least one PUF, a set of PoP responses based on a set of PoP challenges (chalPoP), receiving first PoP data from the host, assembling the first PoP data with second PoP data that is based on the set of PoP responses generated by the at least one PUF to create a PoP master secret, and forwarding the PoP master secret to an authentication module of the host. In one embodiment, the method further comprises providing the second PoP data based on the set of PoP responses generated by the at least one PUF and helper data. In one embodiment, the first PoP data comprises at least a set of host PoP secret shares ($SS_{PoP,H}$) and the second PoP data comprises at least a set of SED PoP secret shares ($SS_{PoP,SED}$). In one embodiment, the first PoP data comprises at least a set of partial host PoP secret shares ($PSS_{PoP,H}$) and the second PoP data comprises at least a set of partial SED PoP secret shares ($PSS_{PoP,SED}$).

In one embodiment, the method further comprises obtaining, by an OWF, a first input that is based on (a) a set of PoP responses ($chal_{PoP}$) generated by the at least one PUF based on a set of PoP challenges ($chal_{PoP}$) and (b) a nonce input from the host, generating an output based on the first input and the nonce input, and forwarding the output to the host. In one embodiment, the method further comprises providing the first input to the OWF based on the set of PoP responses of the at least one PUF and helper data. In one embodiment, the method further comprises providing the first input to the OWF based on the set of DEK responses of the at least one PUF and helper data.

In one embodiment, the method further comprises obtaining the set of SED DEK secret shares ($SS_{SED}$) based on the set of DEK responses of the at least one PUF, generating the additional data, and providing the additional data to the host. In one embodiment, at least one of the secret shares in the set of SED DEK secret shares ($SS_{SED}$) comprises a set of partial SED DEK secret shares. In one embodiment, the set of SED DEK partial secret shares comprises at least a first set of partial SED DEK secret shares ($PSS_{1,SED}$) and a second set of partial SED DEK secret shares ($PSS_{2,SED}$). In one embodiment, the first set of partial SED DEK secret shares ($PSS_{1,SED}$) is based on at least one response in the set of DEK responses. In one embodiment, the method further comprises storing the second set of partial SED DEK secret shares ($PSS_{2,SED}$) on the credential storage of the storage device. In one embodiment, the additional data comprises at least a set of host DEK secret shares ($SS_H$) that is provided to the host. In one embodiment, the additional data comprises at least a set of user DEK secret shares ($SS_U$) that is provided to a user. In one embodiment, the method further comprises providing the set of SED DEK secret shares ($SS_{SED}$) based on the set of DEK responses of the at least one PUF and helper data. In one embodiment, the method further comprises obtaining a set of SED PoP secret shares ($SS_{PoP,SED}$) based on a set of PoP responses of the at least one PUF and providing the set of SED PoP secret shares ($SS_{PoP,SED}$) to the host. In one embodiment, the method further comprises obtaining a set of partial SED PoP secret shares ($PSS_{PoP,SED}$) based on a set of PoP responses of the at least one PUF and providing the set of partial SED PoP secret shares ($PSS_{PoP,SED}$) to the host.

BRIEF DESCRIPTION OF THE DRAWINGS

The accompanying drawing figures incorporated in and forming a part of this specification illustrate several aspects of the disclosure, and together with the description, serve to explain the principles of the disclosure. Optional features are represented by dashed boxes.

DETAILED DESCRIPTION

The embodiments set forth below represent information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure.

The present disclosure is directed to embodiments of a Physically Unclonable Function (PUF) based secret sharing scheme that creates a key for a storage device, such as a Self-Encrypting Drive (SED). U.S. Patent Application Publication No. 2014/0006806 A1 to Corella et al. (hereinafter "Corella") describes a secret sharing solution aimed at decrypting storage devices. The solution includes a user-credential supplied to a storage device and combined with a so-called "proto-credential." By using the user-credential and the proto-credential, the device of Corella may authenticate to several external stores. From these, shares of the content-encryption key can be retrieved. The combination of fetched keys can be assembled into a Data Encryption Key (DEK) using secret sharing. Corella also suggests that the user-credential and the proto-credential can be completed by a PUF response. Corella only handles fetching external from external key stores to recreate a DEK. Corella does not use the user input or PUF response to create a DEK. The solution in Corella is not suitable for a local storage device, such as a Solid-State Disk (SSD) or a flash memory in a mobile phone.

Chinese Patent Application Publication No. CN110233729A (hereinafter "BICTA") describes a method where an SSD with a PUF can be decrypted using a hardware token called "Ukey." The Ukey acts like a middleman between a host and the SSD and verifies the user's password. A DEK to encrypt the SSD is derived by using a PUF response and a hash of the password as input to a threshold encryption scheme. The Ukey and the SSD authenticate each other by encrypting random numbers with pre-shared secrets. Keys used to generate/decrypt the DEK are divided between the Ukey and the SSD using threshold cryptography, which is a concept built on secret sharing.

BICTA uses a hashed password and a PUF to create a DEK to encrypt the drive. The key in BICTA is divided into pieces and uses threshold encryption to recreate the DEK. However, BICTA requires a third component, which is a hardware token (Ukey). In BICTA, the password is checked by the Ukey that requires an additional authentication procedure between the Ukey and the storage device. Moreover, the PUF responses in BICTA are not used as secrets but rather as keys in a threshold encryption scheme where the DEK's equivalent is encrypted and divided amongst the Ukey and storage device.

Figure 1:
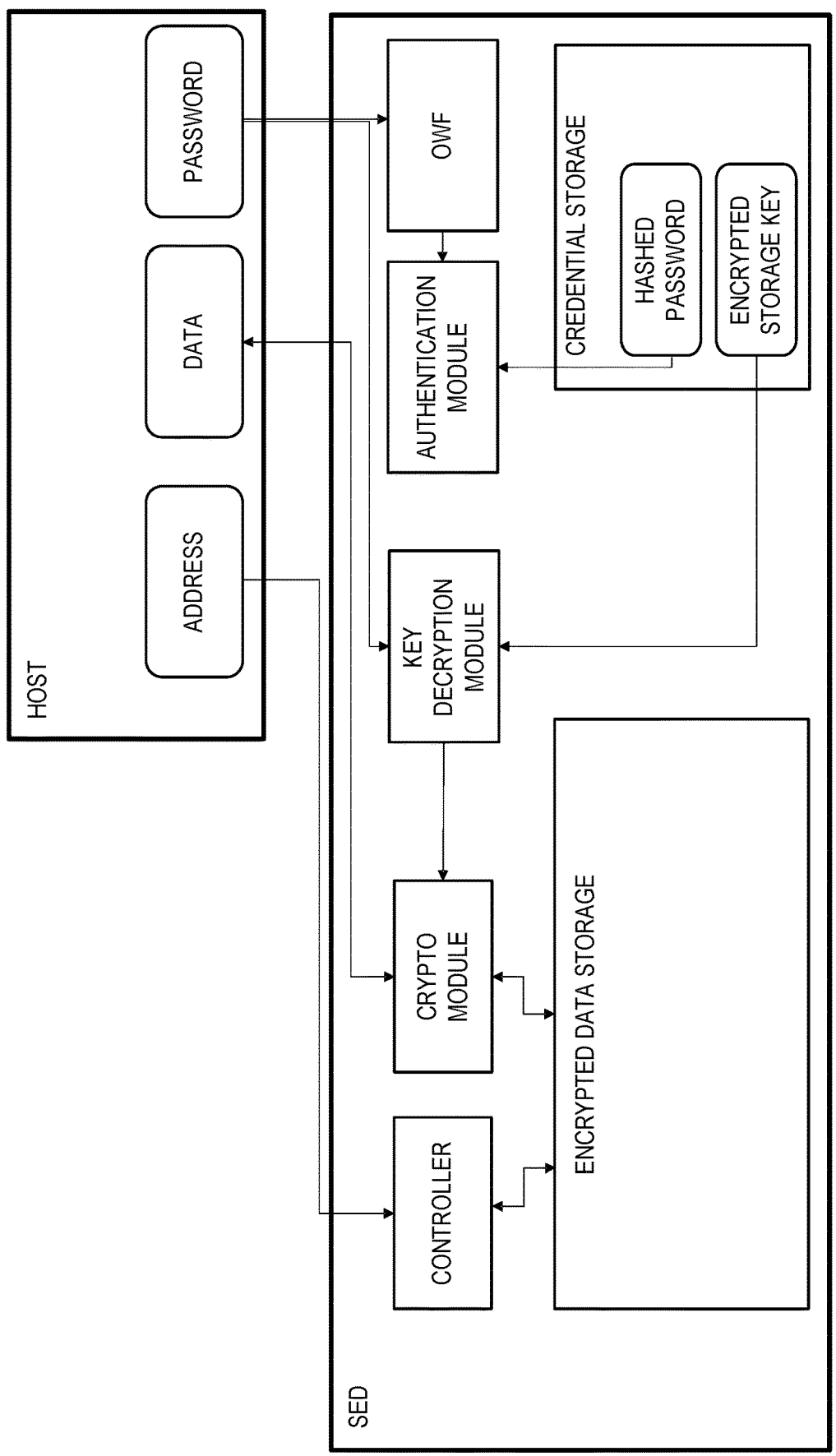
FIG. 1 illustrates one example of current implementations of a Self-Encrypting Disk (SED) and a host under the Trusted Computing Group (TCG) Opal standard.

FIG. 1 illustrates an example of current implementations of an SED under the Trusted Computing Group (TCG) Opal standard. As illustrated, the SED includes a One-Way Function (OWF), an authentication module, a key decryption module, and a crypto module. The OWF receives a password from a host and forwards a transformed password (e.g. a hashed password) to the authentication module. The authentication module then authenticates the received password by comparing the transformed password with a hashed password stored at the SED. If the authentication module determines that the transformed password is valid and legitimate, an encrypted storage key is forwarded to the key decryption module. Next, the key decryption module generates a DEK based on the received encrypted storage key. The crypto module uses the DEK to encrypt incoming data to the SED or to decrypt outgoing data to the host.

One problem with the current implementations of the SED is that there is no means for a user to ensure that data is read or written to an authentic storage device. For example, an attacker can physically replace a storage unit on a target's laptop in a hotel room. The aim of such an attack is to sniff passwords to unlock the authentic device or even collect sensitive data written to the storage device. Hence, it is beneficial to prove that the storage device is legitimate before supplying any password or writing sensitive data to the device.

Another issue with the current implementations of the SED is that the current implementations require the storage of the encrypted DEK(s) on the device, where the DEK(s) is encrypted with a password(s). An attacker who manages to extract the encrypted DEK(s) from the SED can use an offline "brute-force" method or a dictionary attack to crack the password(s) used to encrypt the DEK(s). Thus, the attacker does not need access to the SED to obtain the cleartext DEK(s) after having extracted the encrypted DEK(s) from the SED. A brute-force attack is an attempt to guess a secret (for example, a password or an encryption key) by systematically checking every possible option. A dictionary attack is an attempt to guess a password by trying commonly used passwords. The increasing computational power of computers makes it computationally practical to guess longer and longer passwords.

Another issue with the current implementations of the SED is that, when the SED is unlocked, the decrypted keys are kept in a volatile memory and might be exposed to attacks, especially if the Random Access Memory (RAM) is placed off-chip. Furthermore, when the SED enters a low energy mode, e.g. sleep mode, the storage is allowed, according to the TCG Opal standard, to store the current state of the volatile memory, as well as decrypted keys, in non-volatile memory. Another more expensive alternative is to keep power on for a small portion of the device where the keys are stored, possibly backed up by a battery.

The TCG Opal standard requires that several users can access the same data using different passwords. With the current SED solutions, the TCG Opal standard requires the same key to exist in several versions, encrypted with different passwords. However, if the encryption is based on Exclusive OR (XOR)-encrypting the key with the plaintext password, physical attacks extracting the ciphertext lead to recovery of the key. Hence, the physical attacks may jeopardize all users, as knowledge of the key exposes all passwords. Alternatively, a commonly used procedure is to derive a DEK encryption/decryption key using a key derivation function (KDF), e.g., Password-Based Key Derivation Function 2 (PBKDF2), and use the derived key to encrypt the DEK, finally and encrypted version of the DEK is stored for each user/password. As the encrypted DEKs are stored on disk and potentially can be extracted by a physical attack, the DEK and passwords are still vulnerable to an offline brute-force attack.

Systems and methods are disclosed herein that address at least some of the aforementioned issues with conventional SED solutions. Embodiments of an SED, and methods of operation thereof, are disclosed herein in which a PUF based secret sharing scheme is utilized to recreate a DEK to enable encryption/decryption for an SED. In one embodiment, each of a host (e.g. a computer or a tablet) and an SED holds a secret share needed to recreate the DEK. In one embodiment, if the host is a multi-user device, each user may also have a separate secret share.

In one example embodiment, the PUF based secret sharing uses Shamir secret sharing to create a master secret. For Shamir secret sharing, the master secret is one or several coefficients of a secret polynomial, denoted herein as a "secret DEK polynomial." The participants' secret shares are x and y-coordinates on a curve represented by the secret DEK polynomial. For a secret polynomial of degree n, bn+1 secret shares are needed to recreate the equation of the secret DEK polynomial. An example of the secret DEK polynomial is a curve $(x^2+2x+1)$, which can be defined by the coordinates (x=0, y=1), (1, 3), and (2, 9). In a real implementation, the coefficients of the curve would be much larger, and all computations would be made in a finite field.

Figure 2:
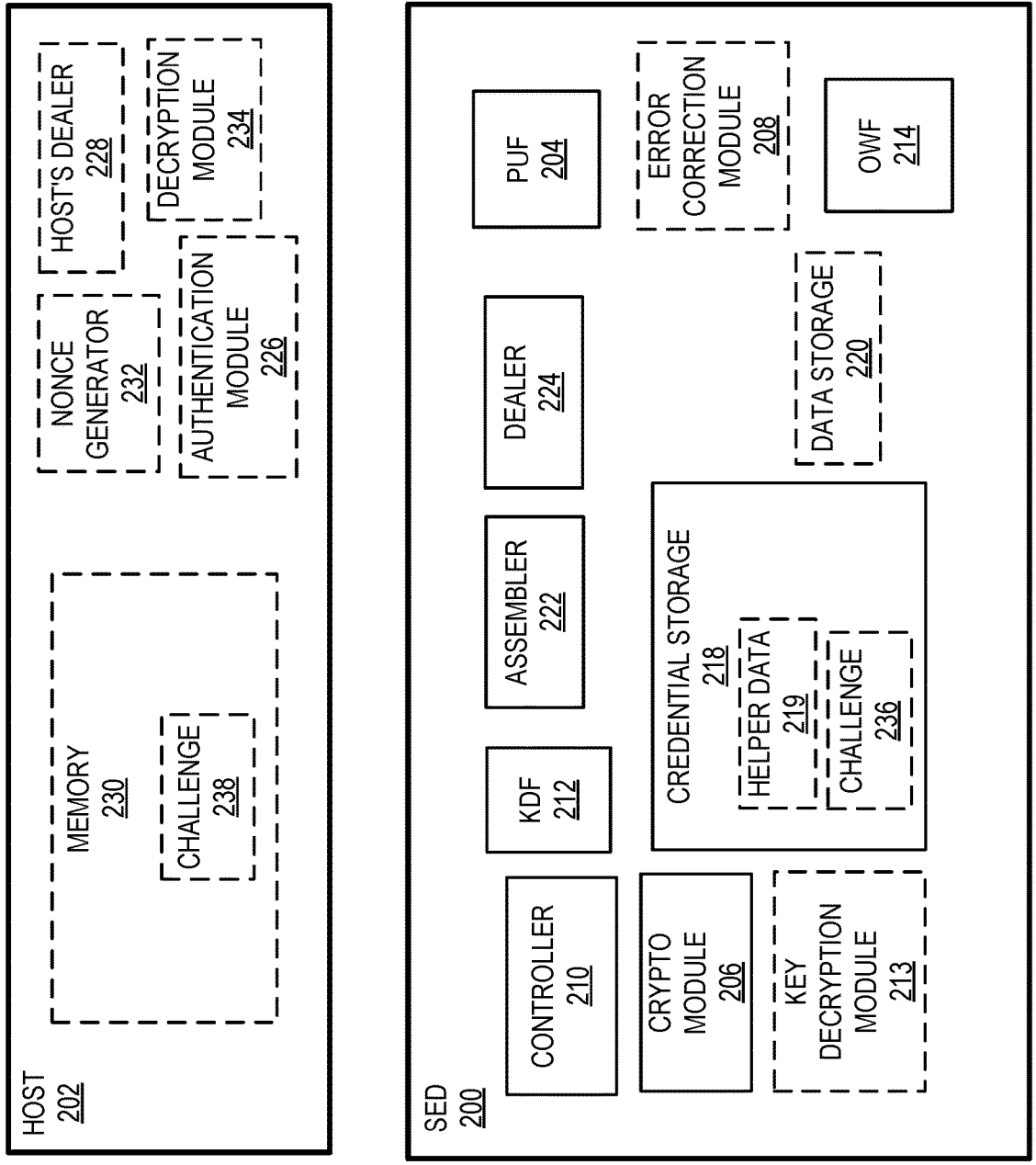
FIG. 2 illustrates one example of a SED and a host where the SED utilizes a Physically Unclonable Function (PUF) based secret sharing scheme in accordance with one embodiment of the present disclosure.

Embodiments of the PUF based secret sharing scheme disclosed herein include three phases, namely, a registration phase, a Proof-of-Possession (PoP) phase, and a key generation phase. In the present disclosure, we differ between different sets of (partial) secret shares depending on the owner and the phase it is used in. "Set of SED DEK secret shares" should be interpreted as a set of secret shares belonging to the SED and used during the key generation phase (where the DEK is (re-)generated). "Set of partial host PoP secret shares" should be interpreted as a set of partial secret shares, (e.g., a y-coordinate without the corresponding x-coordinate or a x-coordinate without the corresponding y-coordinate), belonging to the host and used during the PoP phase. Furthermore, "set of DEK responses/challenges" should be interpreted as PUF challenges and their responsive PUF responses used during the key generation phase. In this regard, FIG. 2 illustrates example embodiments of an SED 200 and a host 202, which may be used to implement the three phases of the PUF based secret sharing scheme. Optional components are represented by dashed lines/boxes. The SED 200 may include the following components:

PUF 204: The PUF 204 takes a challenge and returns a device-unique response. In some embodiments, a PUF with a plurality of challenge-response pairs is preferred. In other embodiments, a PUF with a few or a single challenge-response pair is also allowed. In some embodiments, separation between the PUF 204 functionality for the key generation phase and the PoP phase may be beneficial, such separation can be realized, for example, as two separate PUF implementations or the PUF may only allow two disjoint sets of challenges for PoP and key generation phase.

Crypto module 206: The crypto module 206 handles cryptographic procedures (e.g., encryption and/or decryption). For TCG Opal-compliant devices, the crypto module 206 supports the Advanced Encryption Standard (AES), but other symmetric cryptographic algorithms may additionally or alternatively be supported by the crypto module 206. The crypto module 206 may support one or several modes relevant for disk encryption, such as Liskov, Rivest, and Wagner (LRW) and XOR-encrypt-XOR Tweaked-codebook mode with ciphertext Stealing (XTS).

Error correction module 208: The error correction module 208 corrects PUF responses based on helper data 219 (e.g., error-correcting codes) that contains response specific-information and/or general knowledge regarding the behavior of the PUF 204.

Controller 210: The controller 210 receives requests from the host 202 for reading/writing data into/out of the SED 200.

KDF 212: The KDF 212 is used to create a cryptographic key (i.e., a DEK) from a reconstructed secret DEK polynomial or a specific point on the secret curve defined by the secret DEK polynomial. Depending on particular algorithms, the KDF 212 could be an OWF or a more complex KDF function, such as Argon2, Scrypt, and PBKDF2, to create a key that meets a specific criterion.

Key decryption module 213: The key decryption module 213 is used to decrypt encrypted data, such as an encrypted DEK.

OWF 214: The OWF 214 is a function that is easy to compute on every input but hard to invert given the image of a random input. An example of the OWF 214 is a hash function.

Credential storage area 218: The credential storage area 218 contains non-user-accessible data associated with the PUF 204 or, in some embodiments, encrypted keys. Examples of the non-user-accessible data are:

A set of partial SED DEK secret shares

Helper data 219 that is used by the error correction module 208 to correct errors in PUF responses.

Encrypted DEKs: In one embodiment, encrypted DEKs are stored in the credential storage 218 of the SED 200. Each DEK is encrypted by a key derived from a DEK master secret.

PUF challenges: In most embodiments, challenges used to create (partial) SED DEK secret shares are stored on the SED. In some embodiments, challenges used for the PoP phase are also stored on the SED. In other embodiments, challenges used to create (partial) SED DEK secret shares and/or challenges used for the PoP phase are stored on the host.

Data storage area 220: The data storage area 220 stores encrypted user data and comprises several ranges, encrypted with different keys, possibly belonging to different users.

Assembler 222: The assembler 222 takes secret shares from participants (e.g. the host and users) and reconstructs secret DEK polynomials based on the received shares.

Dealer 224: The dealer 224 constructs secret sharing schemes, i.e., generates secret DEK polynomials and participant secret shares. The dealer 224 distributes the secret shares to the participants of the scheme.

The host 202 may contain the following elements:

Authentication module 226: In some embodiments, the authentication module 226 receives either a coordinate or a polynomial equation that has been reconstructed by the SED 200. The authentication module 226 evaluates the reconstructed coordinate or polynomial equation against a secret PoP polynomial created by the host's dealer 228. In some embodiments, the authentication module 226 instead receives a number used once (nonce) combined with a shared symmetric key and compares the nonce with an output of the OWF.

Host's Dealer 228: In one embodiment where the PoP phase uses secret sharing, the host's dealer 228 constructs secret shares in a scheme for a secret PoP polynomial and distributes the constructed secret shares to participants of the scheme.

Memory 230: The memory 230 of the host may contain secret shares, partial secret shares, challenges, PUF responses, data to be transferred to the SED 200, or data to receive from the SED 200.

Nonce generator 232: The nonce generator 232 generates nonces, which are numbers or bit strings used only once.

Decryption module 234: the decryption module 234 is used to decrypt host shares when a correct user credential is given.

Registration Phase

Figure 3A:
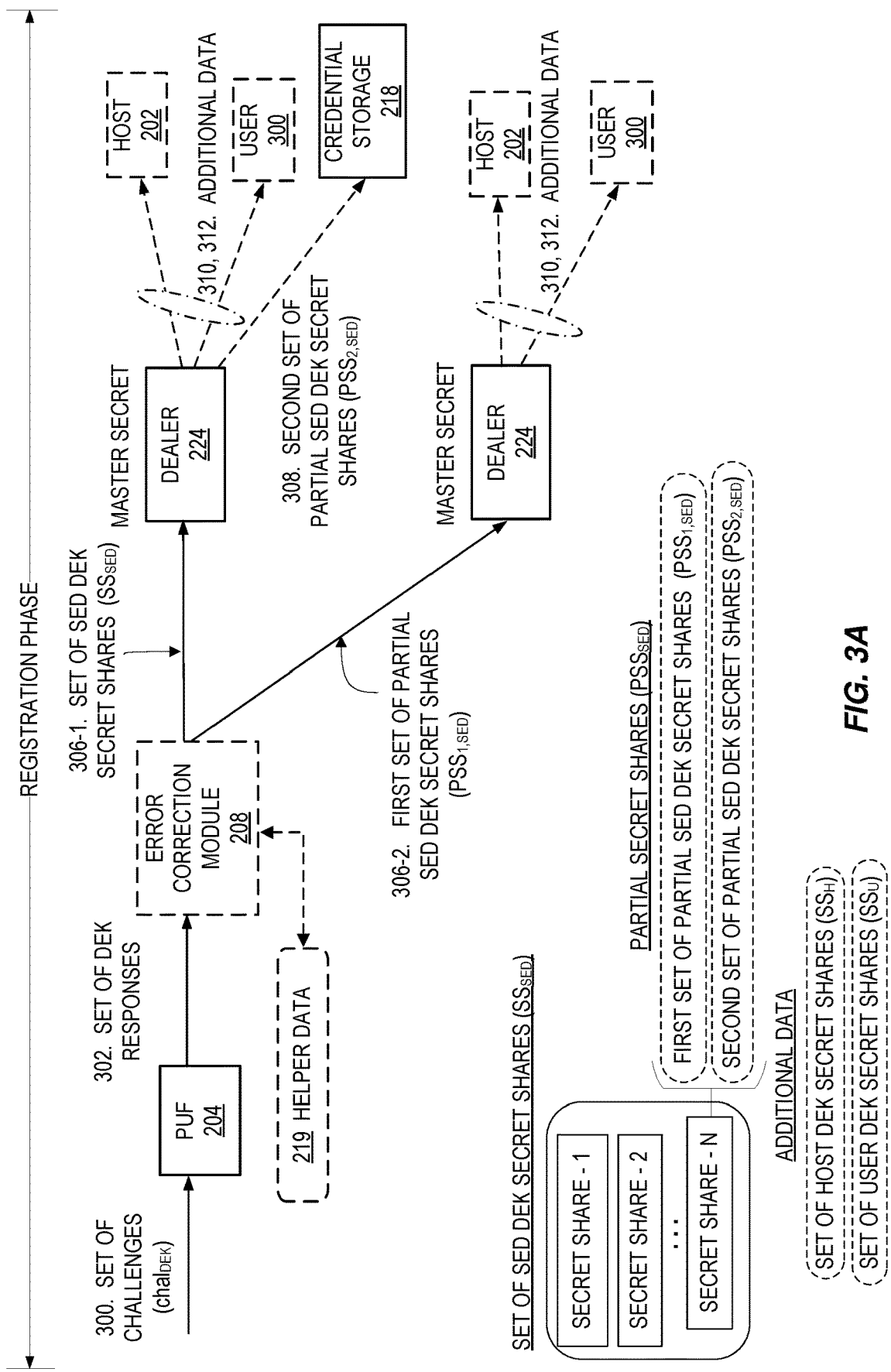
FIG. 3A is an illustration of a registration phase of a PUF based secret sharing scheme utilized by the SED to generate secret shares, partial secret shares, a master secret, and additional data during the registration phase in accordance with one embodiment of the present disclosure.

FIG. 3A illustrates the operation of components of the SED 200 and the host 202 during the registration phase, in accordance with one embodiment of the present disclosure. Throughout the present disclosure, the SED 200 is also referred as a storage device or encrypted storage device or the like. As illustrated in FIG. 3A, in the registration phase, the PUF 204 of the SED 200 receives a set of DEK challenges and generates a set of DEK responses based on the set of DEK challenges. Optionally, the error correction module 208 may perform an error-correction of the set of DEK responses based on helper data 219 such as, e.g., predefined or preconfigured error correction code. The error-correction module may also generate response-specific helper data. The dealer 224 uses the (error-corrected) set of DEK responses as either (1) a first set of partial SED DEK secret shares ($PSS_{1,SED}$) (e.g. X-coordinates) or (2) a set of SED DEK secret shares ($SS_{SED}$) (e.g. X-coordinates and Y-coordinates). In regard to (1), the first set of partial SED DEK secret shares ($PSS_{1,SED}$) (e.g. X-coordinates) together with a second set of partial SED DEK secret shares ($PSS_{2,SED}$) (e.g. Y-coordinates) form the set of SED DEK secret shares ($SS_{SED}$). As discussed below, the second set of partial SED DEK secret shares ($PSS_{2,SED}$) is stored at the SED 200 for subsequent use during the key generation phase. Alternatively, in option (2), the (error-corrected) set of DEK responses is directly used as the set of SED DEK secret shares ($SS_{SED}$). In either option, the set of SED DEK secret shares ($SS_{SED}$) includes one or more secret shares.

In the first option where the dealer 224 uses the (error-corrected) set of DEK responses as the first set of partial SED DEK secret shares ($PSS_{1,SED}$), e.g. in Shamir secret sharing scheme, the dealer 224 generates the secret DEK polynomial that defines a DEK master secret randomly such that the first set of partial SED DEK secret shares ($PSS_{1,SED}$) are the X-coordinates for a corresponding number of points of the curve defined by the secret DEK polynomial. The corresponding Y-coordinates of the points on the secret polynomial curve create the second set of partial SED DEK secret shares ($PSS_{2,SED}$). That is, the dealer 224 generates a random polynomial curve, which is a secret DEK polynomial, and uses the random polynomial curve to create the second set of partial SED DEK secret shares ($PSS_{2,SED}$) that contains missing Y-coordinates for the set of SED DEK secret shares ($SS_{SED}$). Note that, alternatively, the second set of partial SED DEK secret shares ($PSS_{2,SED}$) are the X-coordinates, and the first set of partial SED DEK secret shares ($PSS_{1,SED}$) are the Y-coordinates. Individually, the partial secret shares, such as the first set of partial SED DEK secret shares ($PSS_{1,SED}$) and the second set of partial SED DEK secret shares ($PSS_{2,SED}$), do not contain any information, but the combination of the two sets of partial SED secret shares provide the first set of SED secret shares that may be used to help reconstruct the secret DEK polynomial. In one embodiment, the second set of partial SED DEK secret shares ($PSS_{2,SED}$) is stored in the credential storage 218 of the SED 200 and used later in the key generation phase. The first set of partial SED DEK secret shares ($PSS_{1,SED}$) may be deleted after the registration phase (e.g., after the second set of partial SED DEK secret shares ($PSS_{2,SED}$) has been created).

In the second case where the dealer uses the (error-corrected) set of DEK responses as the set of SED DEK secret shares ($SS_{SED}$), the dealer 224 generates the DEK master secret using the set of SED DEK secret shares ($SS_{SED}$) as the X and Y coordinates of points on the secret DEK polynomial curve.

The dealer 224 also extracts additional data from the secret DEK polynomial to provide one or more additional secret shares to be distributed to the host 202 and, in some embodiments, one or more users. More specifically, in one embodiment, the additional data includes a set of host DEK secret shares ($SS_H$) to be distributed to the host 202. The set of host DEK secret shares ($SS_H$) corresponds to a second set of points on the secret DEK polynomial curve. The additional data may also contain one or more additional sets of secret shares, referred to herein as one or more sets of user DEK secret shares ($SS_U$), that correspond to one or more additional sets of points on the secret DEK polynomial curve. The one or more sets of user DEK secret shares ($SS_U$) are given to one or more users, respectively.

In one embodiment, the properties (t, n) of the PUF-based secret sharing scheme are chosen so that at least one SED secret share and at least one additional secret share (e.g., a host secret share and one or more user secret shares) are needed to enable reconstruction of the master key (e.g., the DEK or a key used to decrypt an encrypted DEK). These requirements can be expressed as:

Let s denote the number of SED secret shares in the set of SED DEK secret shares ($SS_{SED}$), $S \leq t-1$ Let a denote the number of additional secret shares in the set of host secret shares and, if present, the one or more sets of user secret shares, $a \leq t-1$ As s+a=n, the total number of secret shares (n) is chosen such that $t \leq n \leq 2t-2$.

Moreover, in the registration phase, the host 202 and the SED 200 may prepare for a PoP phase, which is described below. In one embodiment, the primary purpose of the PoP phase is for the host 202 to authenticate the SED 200 before the host provides any secret shares to the SED 200. In other embodiments, mutual authentication or authentication of the host 202 and any user(s) may be supported.

As discussed below in detail, this preparation for the PoP phase may include one more aspects related to a secret-sharing based PoP scheme. For example, the SED 200 may generate a set of partial SED PoP secret shares ($PSS_{PoP,SED}$), based on a set of PoP responses and provide the set of partial SED PoP secret shares ($PSS_{PoP,SED}$) to the host 202, where the set of partial SED PoP secret shares ($PSS_{PoP,SED}$) is not stored by the SED 200 and subsequently used by the host 202 for authenticating the SED 200 during the PoP phase. As another example, the SED 200 may generate a set of SED PoP secret shares ($SS_{PoP,SED}$) based on a set of PoP responses and provide the secret shares ($SS_{PoP,SED}$) to the host 202, where the set of SED PoP secret shares ($SS_{PoP,SED}$) is not stored by the SED 200 and subsequently used by the host 202 for authenticating the SED 200 during the PoP phase. Preparation for the PoP phase may alternatively include one or more aspects related to a symmetric shared key based PoP scheme. For example, during the registration phase, the SED 200 may generate one or more PoP responses based on one or more respective challenges, where the one or more PoP responses are provided to the host 202 and subsequently used by the host to authenticate the SED 200 during the PoP phase.

While many of the embodiments of the PUF-based secret sharing scheme described herein incorporate a Shamir secret sharing scheme, the PUF-based secret sharing scheme may alternatively incorporate other types of secret sharing schemes, e.g. Blakley's secret sharing scheme.

Figure 3B:
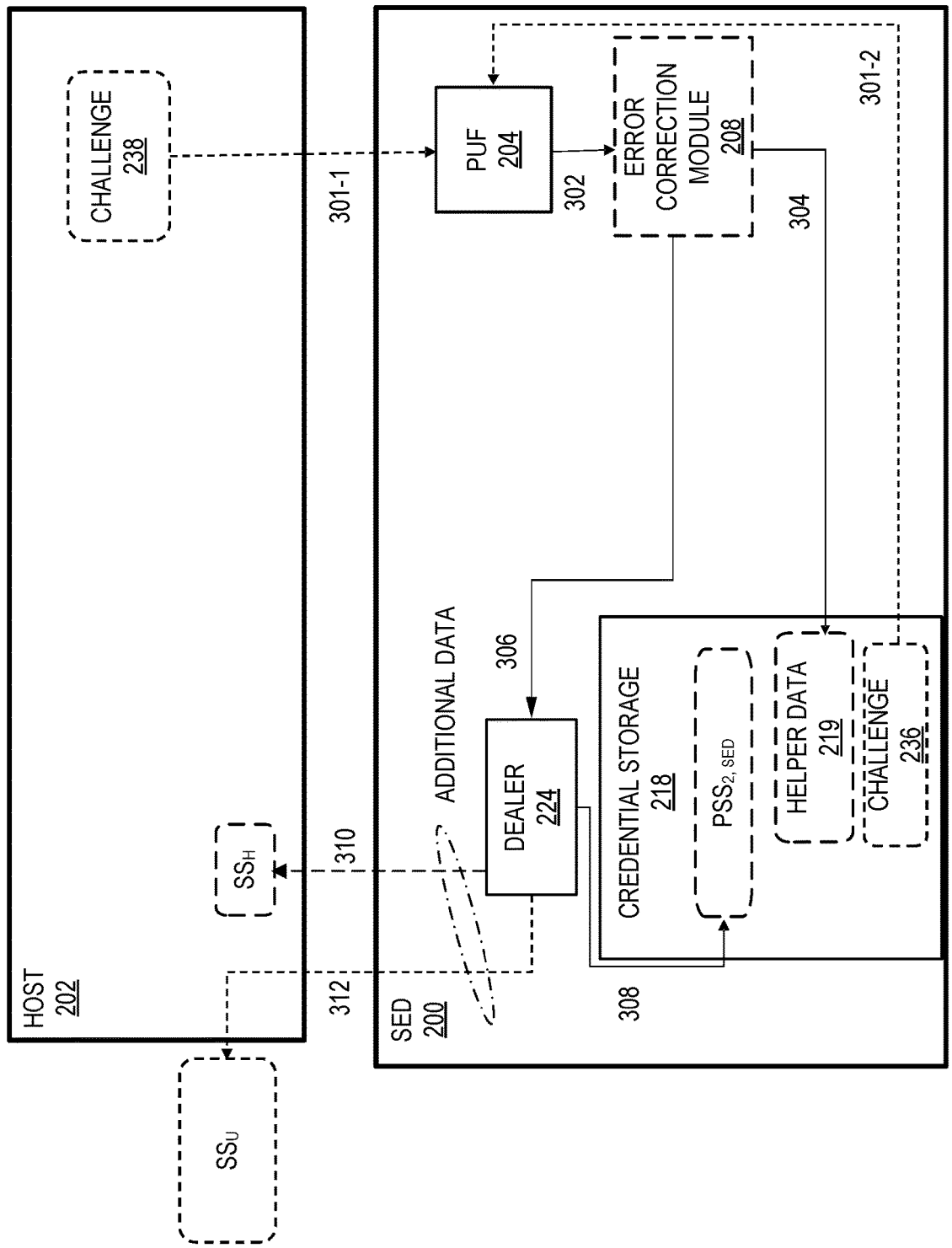
FIG. 3B illustrates a procedure performed by the SED and the host during the registration phase, which are related to the subsequent key generation, in accordance with one embodiment of the present disclosure.

FIG. 3B illustrates a procedure performed by the SED 200 and the host 202 during the DEK registration phase, which are related to the subsequent DEK key generation, in accordance with one embodiment of the present disclosure. The steps of the procedure illustrated in FIG. 3B are as follows. Note, however, that not all of the following steps may be required for all embodiments. Some steps may be omitted.

Step 300: In one embodiment, the host 202 supplies a set of DEK challenges to the SED 200 for input to the PUF 204 during the registration phase (step 300-1). In another embodiment, the set of DEK challenges to be input to the PUF 204 during the DEK registration phase is already preconfigured in the SED 200 (step 300-2). In yet another embodiment, the host 202 supplies one set of DEK challenges and another set of DEK challenges is already preconfigured in the SED 200, where these two sets of challenges are combined into the set of DEK challenges to be provided to the PUF 204 during the registration phase. Whether the set of DEK challenges to be input to the PUF 204 are provided by the host 202, obtained from storage at the SED 200, or a combination thereof, the set of DEK challenges to be input to the PUF 204 during the registration phase is referred to herein as the set of DEK challenges (chalDEK) input to the PUF 204 during the registration phase, which is illustrated in FIG. 3A.

Steps 302, 304: The PUF 204 generates the set of DEK responses based on the set of DEK challenges (chalDEK). In one embodiment, the set of DEK responses may be generated many times to facilitate the future generation of a stable response. In other words, the helper data 219 may be generated based on an analysis of the multiple instances of the set of DEK responses generated by the PUF responsive to the set of DEK challenges (chalDEK) to, e.g., provide an error correction code or other helper data to enable re-generation of the same set of DEK responses responsive to the set of DEK challenges (chalDEK), e.g., during the DEK key generation phase (step 304). Alternatively, the helper data 219 may be predetermined and stored in the SED 200, based on general knowledge regarding the PUF 204 (e.g., discarding unstable bits).

Step 306: Optionally, the error correction module 208 performs an error correction on the set of DEK responses to provide an error-corrected set of DEK responses to the dealer 224.

Steps 308, 310, and 312: The dealer 224 generates the secret DEK polynomial, using the (error-corrected) set of DEK responses as either (1) the first set of partial SED DEK secret shares ($PSS_{1,SED}$) (e.g. X-coordinates) or (2) the set of SED DEK secret shares ($SS_{SED}$) (e.g. X-coordinates and Y-coordinates), as described above. The master secret is extracted from the secret DEK polynomial. In the first case where the first set of partial SED DEK secret shares ($PSS_{1,SED}$) is used, the dealer 224 generates the second set of partial SED DEK secret shares ($PSS_{2,SED}$) that completes the first set of partial SED DEK secret shares ($PSS_{1,SED}$) and saves the second set of partial SED DEK secret shares ($PSS_{2,SED}$) on the credential storage 218 of the SED 200 (step 308). Further, at least two additional (e.g., random) points on the secret DEK polynomial that defines the master secret are used to derive external participant secret shares for the host 202 and possibly to one or several users. These external participant secret shares are distributed as complete x- and y-coordinates. Those external participant secret shares are the additional data illustrated in FIG. 3A and FIG. 3B. The additional data may include the set of host DEK secret shares ($SS_H$) and the one or more sets of user DEK secret shares ($SS_U$). The host 202 stores the set of host DEK secret shares ($SS_H$) (step 310).

Figure 3C:
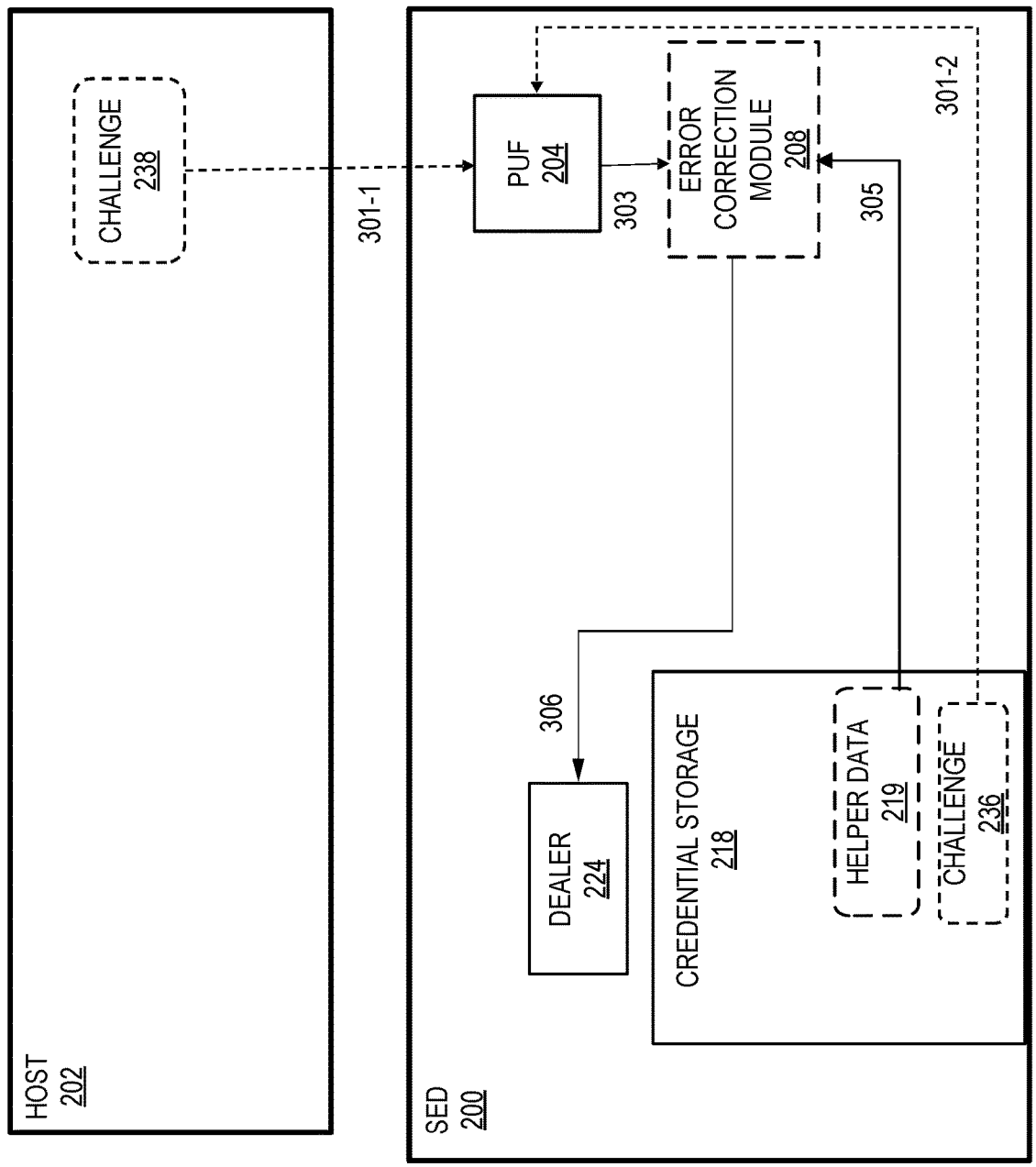
FIG. 3C illustrates Proof-of-Possession (PoP) preparation procedures performed by the SED and the host during the registration phase in accordance with one embodiment of the present disclosure.

FIG. 3C illustrates PoP preparation procedures performed by the SED 200 and the host 202 during the registration phase. In particular, FIG. 3C illustrates steps of two exemplary PoP preparations during the registration phase; the secret-sharing based PoP scheme and the symmetric shared key based PoP scheme. Note, however, that not all of the following steps may be required for all embodiments. Some steps may be omitted.

Step 301: In one embodiment, the host 202 supplies a set of PoP challenges to the SED 200 for input to the PUF 204 during the registration phase (step 301-1). In another embodiment, the set of PoP challenges to be input to the PUF 204 during the DEK registration phase is already preconfigured in the SED 200 (step 301-2). In yet another embodiment, the host 202 supplies one set of PoP challenges and another set of PoP challenges is already preconfigured in the SED 200, where these two sets of challenges are combined into the set of PoP challenges to be provided to the PUF 204 during the registration phase. Whether the set of PoP challenges to be input to the PUF 204 are provided by the host 202, obtained from the credential storage 218, or a combination thereof, the set of PoP challenges to be input to the PUF 204 during the PoP preparation of the registration phase is referred to herein as the set of PoP challenges ($chal_{PoP}$) input to the PUF 204.

Step 303: The PUF 204 generates the set of PoP responses based on the set of PoP challenges ($chal_{PoP}$).

Steps 305, 306: Optionally, the error correction module 208 obtains (305) the helper data 219 from the credential storage 218 and performs an error correction on the set of PoP responses based on the helper data 219 to thereby provide an error-corrected set of PoP responses. The dealer 224 obtains (306) the (error-corrected) set of PoP responses. The error-correction module may also generate response-specific helper data at this stage.

Steps 314, 316: The dealer 224 may generate a set of partial SED PoP secret shares ($PSS_{PoP,SED}$) based on the (error-corrected) set of PoP responses and provide the set of partial SED PoP secret shares ($PSS_{PoP,SED}$) to the host 202 (step 314). The dealer 224 may generate a set of SED PoP secret shares ($SS_{PoP,SED}$) based on the (error-corrected) set of PoP responses and provide the set of SED PoP secret shares ($SS_{PoP,SED}$) to the host 202 (step 316). These (partial) secret shares may be used during the PoP phase under the secret-sharing scheme.

Step 318: The dealer 224 may provide (318) the (error-corrected) set of PoP responses to the host 202 which may be stored as (302). This step may be used during the PoP phase under the symmetric shared key based PoP scheme.

PoP Preparations and PoP Phase

The purpose of the PoP phase is for the host 202 and/or a user to authenticate that the SED 200 is the same SED used in the registration phase. This PoP phase reduces the risk of exposing secret shares to devices with malicious intent. It is assumed that only the legitimate SED has access to the secrets and that an SED that does not have access is illegitimate.

As the SED 200 uses the PUF 204 to generate the secrets in the embodiments of the present disclosure, one way to prove the PoP is to generate something that is not a part of the PUF-based secret sharing scheme used to reconstruct the DEK but likewise must originate from the PUF 204.

In some embodiments, the host 202 also wants to verify that the SED 200 has the capability to recreate the secret DEK polynomial, as a legitimate SED must have this capability. This can be accomplished by choosing a secret sharing-based PoP scheme.

In some embodiments, the host 202 verifies PoP without involvement of a user. In other embodiments, it is up to each user to verify the PoP. Different users may have different authentication responses. If the SED 200 has proven PoP, the host 202 and/or the user can safely supply their secret shares to the SED 200 and begin the key generation phase. Otherwise, the process is aborted without any secrets having been exposed.

In one embodiment, the SED 200 proves PoP using the secret sharing based method. Using this secret sharing based method, the SED 200 delivers a two-part proof to the host. First, the SED 200 proves that it has access to the PUF 204, which generated the secrets during the registration phase that occurred before the PoP phase. Second, the SED 200 proves that it has the capability to assemble shares into the secret DEK polynomial, e.g. using Lagrange Interpolation.

Figure 4A:
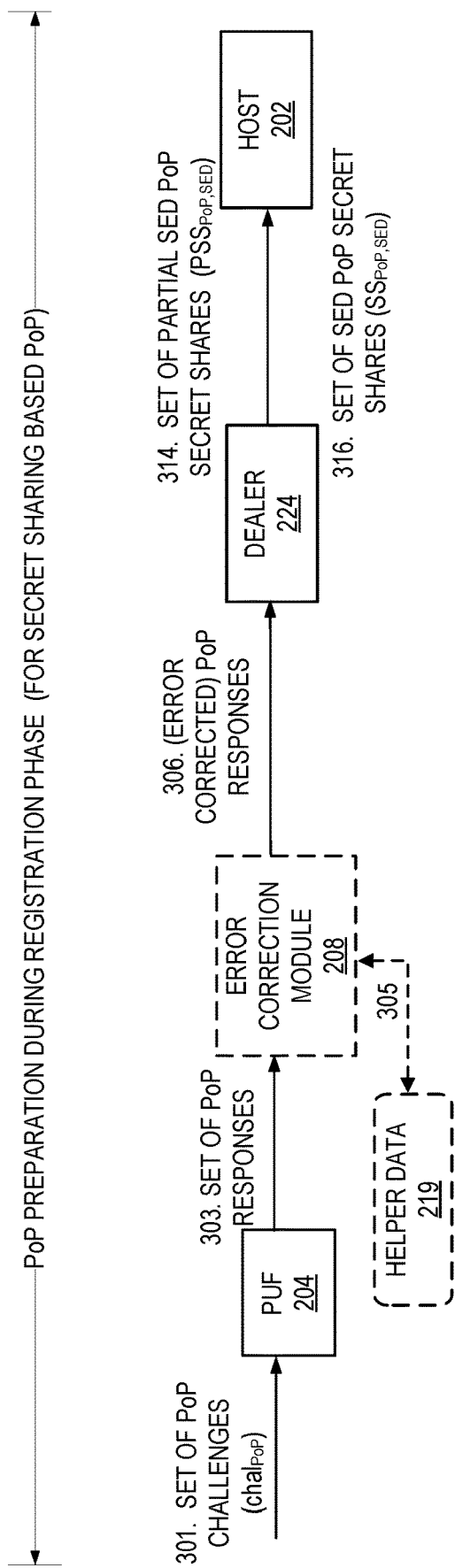
FIG. 4A illustrates components and steps involved in the PoP preparation during the registration phase for a secret sharing based PoP.

FIG. 4A illustrates components and steps involved in PoP preparation during the registration phase under the secret sharing based PoP scheme. As illustrated, the PUF 204 obtains the set of PoP challenges ($chal_{PoP}$) (step 301) and generates the set of PoP responses based on the set of PoP challenges ($chal_{PoP}$) (step 303). Optionally, the error correction module 208 obtains the helper data 219 from the credential storage 218 and performs an error correction on the set of PoP responses based on the helper data 219 to thereby provide an error-corrected set of PoP responses (step 306). The error-correction module may also generate response-specific helper data. The dealer 224 obtains the (error-corrected) PoP responses, generates and forwards the set of partial SED PoP secret shares ($PSS_{PoP,SED}$) and/or the set of SED PoP secret shares ($SS_{PoP,SED}$) (steps 314, 316) to the host 202.

Figure 4B:
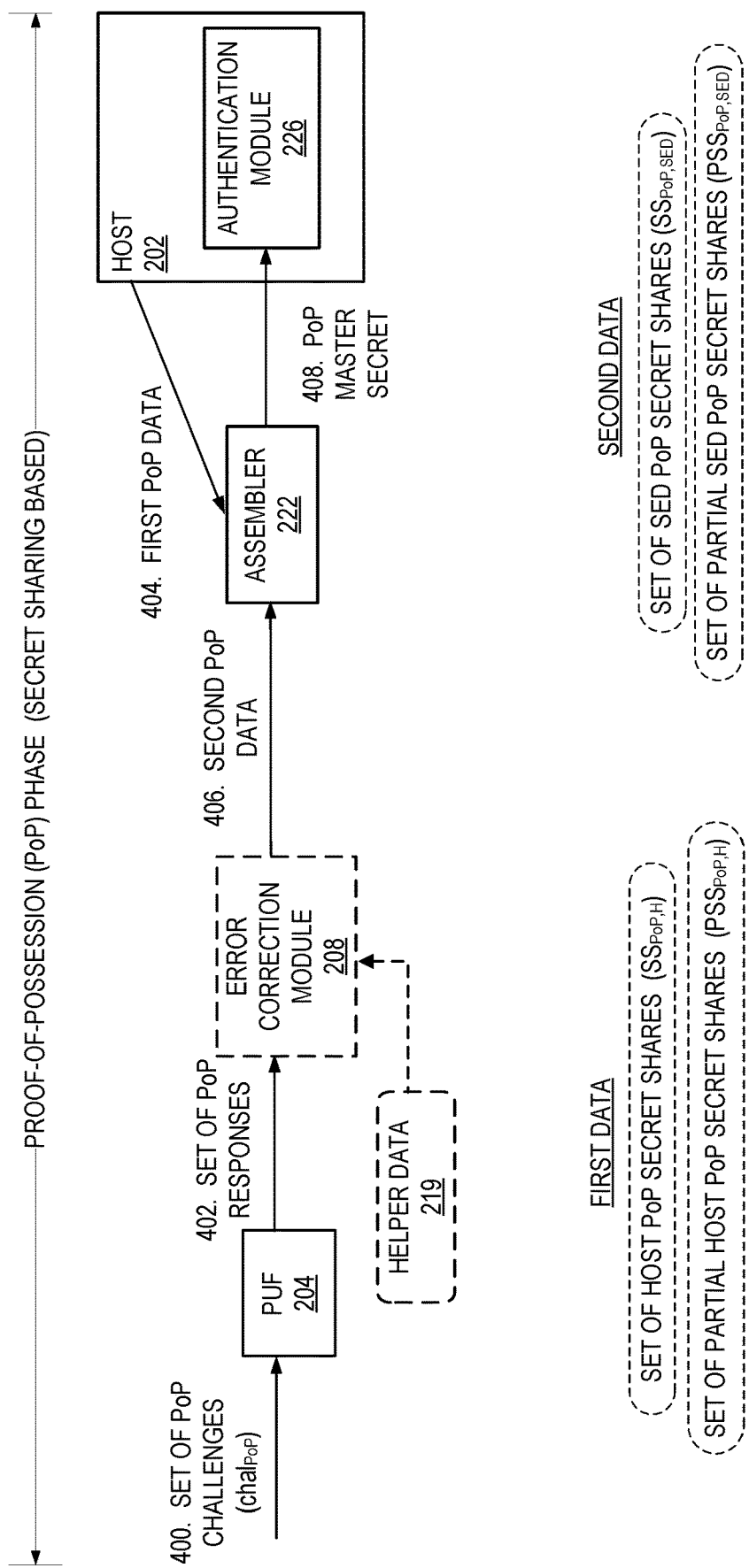
FIG. 4B is an illustration of the secret sharing based PoP operation performed by the SED during the PoP phase in accordance with one embodiment of the present disclosure.

FIG. 4B illustrates components and steps involved in the secret sharing based PoP phase. The PUF 204 generates a set of PoP responses based on a set of PoP challenges ($chal_{PoP}$) (step 400). Just as in the registration phase, the set of PoP challenges ($chal_{PoP}$) may be challenges provided by the host 202 or challenges saved in the SED 200. Optionally, the error correction module 208 performs an error-correction of the set of PoP responses based on the helper data 219, which was saved in the registration phase. The assembler 222 receives the output of the PUF 204 (or optionally, the output of the error correction module 208) as the "second PoP data" (step 406) and assembles the second PoP data with the "first PoP data" received from the host 202 (step 404). Based on the combination of the first PoP data and the second PoP data, the assembler 222 generates a PoP master secret and forwards the PoP master secret to the authentication module 226 of the host 202 (step 408). For example, the first PoP data may comprise a set of host PoP secret shares ($SS_{PoP,H}$) or a set of partial host PoP secret shares ($PSS_{PoP,H}$). For example, the second PoP data may comprise a set of SED PoP secret shares ($SS_{PoP,SED}$) or a set of partial SED PoP secret shares ($PSS_{PoP,SED}$).

Figure 4C:
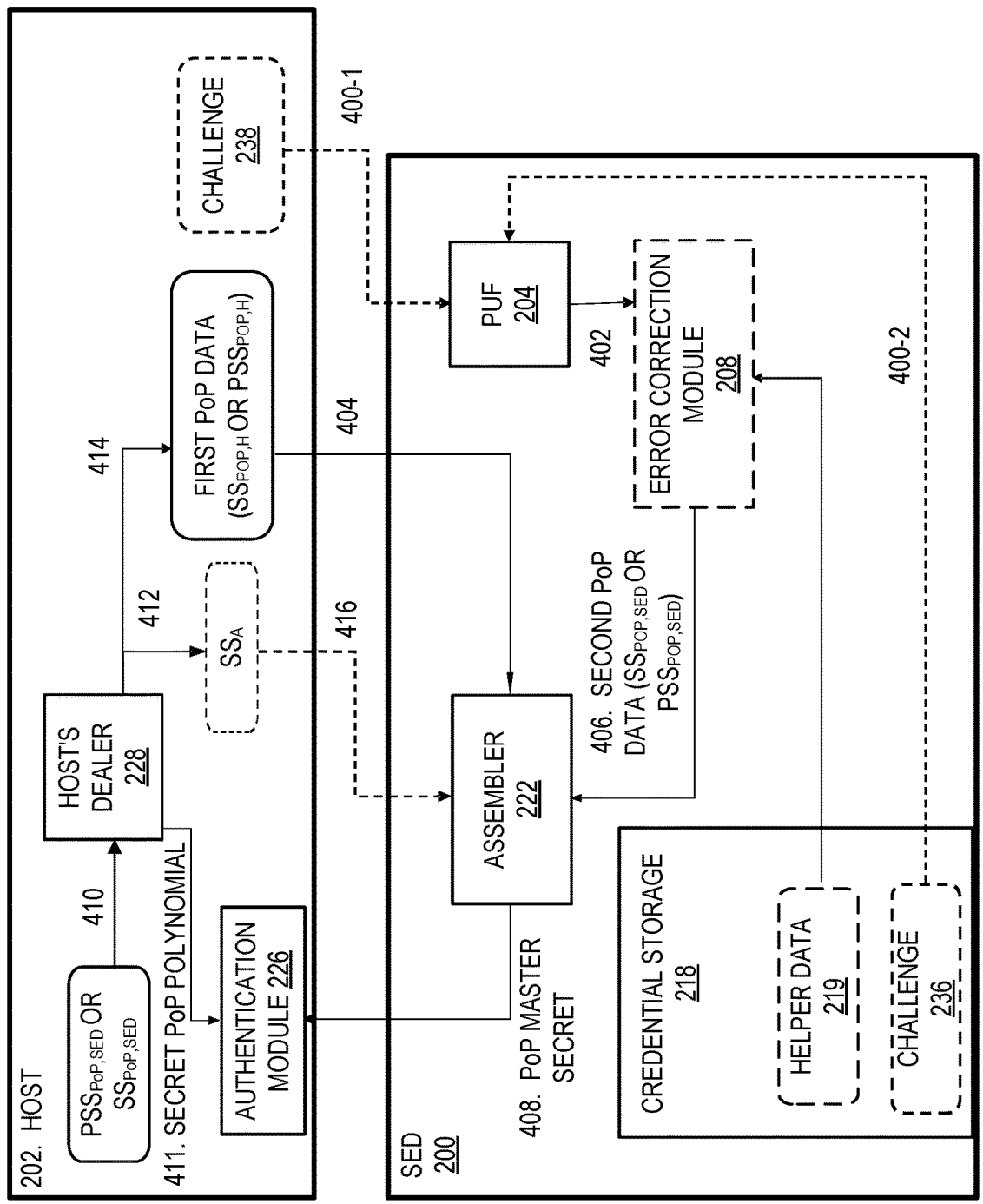
FIG. 4C illustrates the secret sharing based PoP operation of the SED and the host during the PoP phase in accordance with one embodiment of the present disclosure.

FIG. 4C illustrates one example of steps and components in the secret sharing-based PoP phase.

Step 400: In one embodiment, the host 202 supplies a set of PoP challenges ($chal_{PoP}$) to the SED 200 for input to the PUF 204 (step 400-1). In another embodiment, the set of PoP challenges ($chal_{PoP}$) to be input to the PUF 204 is already saved in the SED 200 (step 400-2). In yet another embodiment, the host 202 supplies one set of PoP challenges and another set of PoP challenges is already saved in the SED 200, where these two sets of challenges are combined to provide the set of PoP challenges ($chal_{PoP}$) to be provided to the PUF 204. Whether the set of PoP challenges ($chal_{PoP}$) to be input to the PUF 204 are provided by the host 202, obtained from storage at the SED 200, or a combination thereof, the set of PoP challenges ($chal_{PoP}$) to be input to the PUF 204 is referred to herein as the set of PoP challenges ($chal_{PoP}$) input to the PUF 204 during the registration phase, which is illustrated in FIG. 4B.

Step 402: The PUF generates a set of PoP responses corresponding to the set of PoP challenges ($chal_{PoP}$). The generated PoP responses may contain errors. Optionally, the error correction module 208 performs an error-correction on the set of PoP responses to provide an error-corrected set of PoP responses to the assembler 222.

Step 404: The assembler 222 receives the first PoP data from the host 202. The first PoP data may comprise a set of host PoP secret shares ($SS_{PoP,H}$) and/or a set of partial host PoP secret shares ($PSS_{PoP,H}$). For example, the set of host PoP secret shares ($SS_{PoP,H}$) may comprise a pair of x-coordinate and y-coordinate, and the set of partial host PoP secret shares ($PSS_{PoP,H}$) may comprise either x-coordinate or y-coordinate.

Step 406: The assembler 222 obtains the set of PoP responses as the second PoP data, which may comprise a set of SED PoP secret shares ($SS_{PoP,SED}$) or a set of partial SED PoP secret shares ($PSS_{PoP,SED}$). For example, the coordinate (e.g. x-coordinate) of the set of partial SED PoP secret shares ($PSS_{PoP,SED}$) may correspond to the coordinate (e.g. corresponding y-coordinate) of the set of partial host PoP secret shares ($PSS_{PoP,H}$).

Step 408: The assembler 222 combines the first PoP data from the host 202 and the second PoP data from the PUF 204 and produces a secret PoP polynomial, which comprises completed PoP shares. Optionally, the assembler 222 further receives the additional secret shares ($SS_A$) from the host 202. Those additional secret shares ($SS_A$) may ensure that each of the PoP phases uses a fresh curve, which offers protection against replay attacks. The assembler 222 may combine the additional secret shares ($SS_A$) with the first PoP data and the second PoP data and construct the secret PoP polynomial. The assembler 222 provides the secret PoP polynomial as the PoP master secret to the authentication module 226 of the host 202.

The host 202 has the following steps during the secret sharing based PoP phase.

Step 410: The host's dealer 228 obtains the set of partial SED PoP secret shares ($PSS_{PoP,SED}$) and/or the set of SED PoP secret shares ($SS_{PoP,SED}$), which are previously prepared and stored in the host 202 during the registration phase.

Steps 411: The host's dealer 228 generates a secret PoP polynomial based on the set of partial SED PoP secret shares ($PSS_{PoP,SED}$) and/or the set of SED PoP secret shares ($SS_{PoP,SED}$) and provides the secret PoP polynomial to the authentication module 226. The host's dealer 228 may generate a new secret PoP polynomial at each PoP procedure to generate fresh $SS_A$ shares and prevent replay attacks. Then, the authentication module 226 performs an authentication by comparing the secret PoP polynomial and the PoP master secret received from the SED 200. If the authentication is successful, the SED 200 has proven that it has access to the PUF 204 that was used during the registration phase and has the ability to perform Lagrange Interpolation to reconstruct the secret DEK polynomial. After the PoP process is completed, the host 202 and the SED 200 may move to the key generation phase.

Steps 412, 414: The host's dealer 228 also generates the additional secret shares ($SS_A$) and the first PoP data, such as the set of host PoP secret shares ($SS_{PoP,H}$) or a set of partial host PoP secret shares ($PSS_{PoP,H}$) (steps 412, 414). As illustrated, the host 202 provides the additional secret shares and the first PoP data to the SED 200 (steps 404, 416).

Alternatively, the PoP phase may be implemented based on a shared symmetric key scheme. In one embodiment, the SED 200 shows that the SED 200 has access to the secret shared key that was set up between the SED 200 and the host 202 during the registration phase. The secret shared key is derived using the PUF. In this embodiment, the main goal of the secret shared key scheme is not to prove that the SED 200 has the ability to reconstruct secrets. Instead, the proof is only used to prove that the SED 200 has access to the PUF.

Figure 5A:
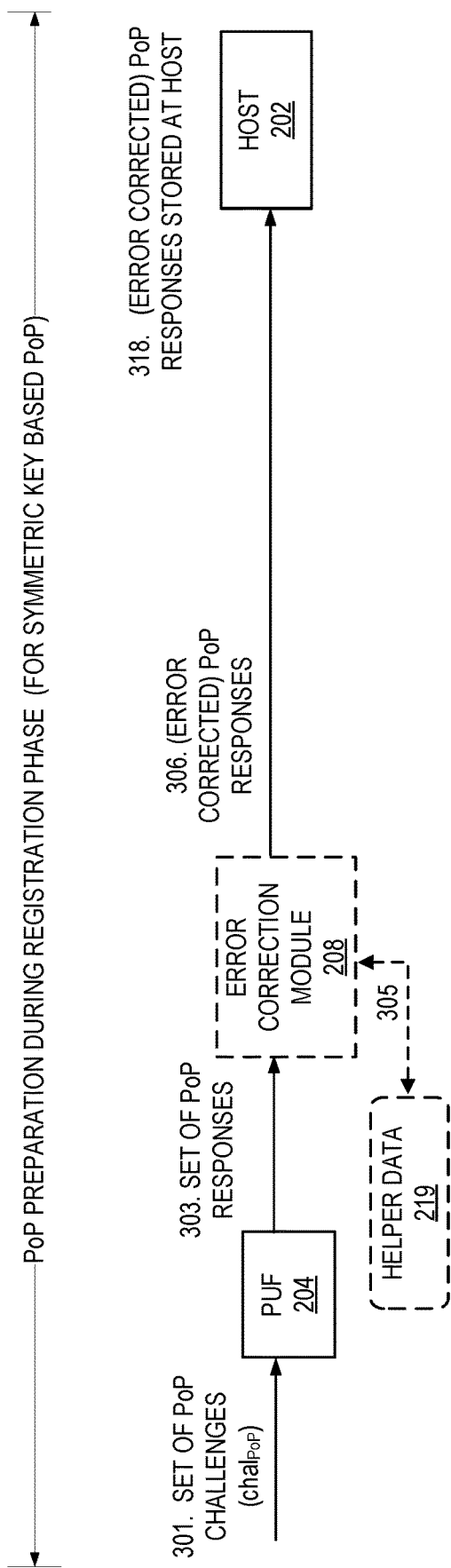
FIG. 5A illustrates components and steps involved in the PoP preparation during the registration phase for a symmetric key based PoP.

FIG. 5A illustrates components and steps involved in the PoP preparation during the registration phase for the symmetric key based scheme. Steps 301, 303, 305, and 306 are the same as in FIG. 4A. As illustrated, during the registration phase, the SED 200 derives one (or several) PoP response(s) corresponding to one (or several) PoP challenge(s) ($chal_{PoP}$) that may be supplied by the host 202 (step 306). The PoP response(s) are returned to and are stored in the host 202 (step 318).

During the shared symmetric key based PoP phase, the host 202 supplies a nonce to the SED 200 and requires the SED 200 to show that the SED 200 can create a token comprising a nonce plus the PoP response. That is, the nonce is used to protect against replay attacks. Alternatively, the host 202 may store a large amount of PoP responses, each belonging to a specific challenge, and supply a specific challenge during the proof-of-possession phase. In this case, the challenge may only be used once.

Figure 5B:
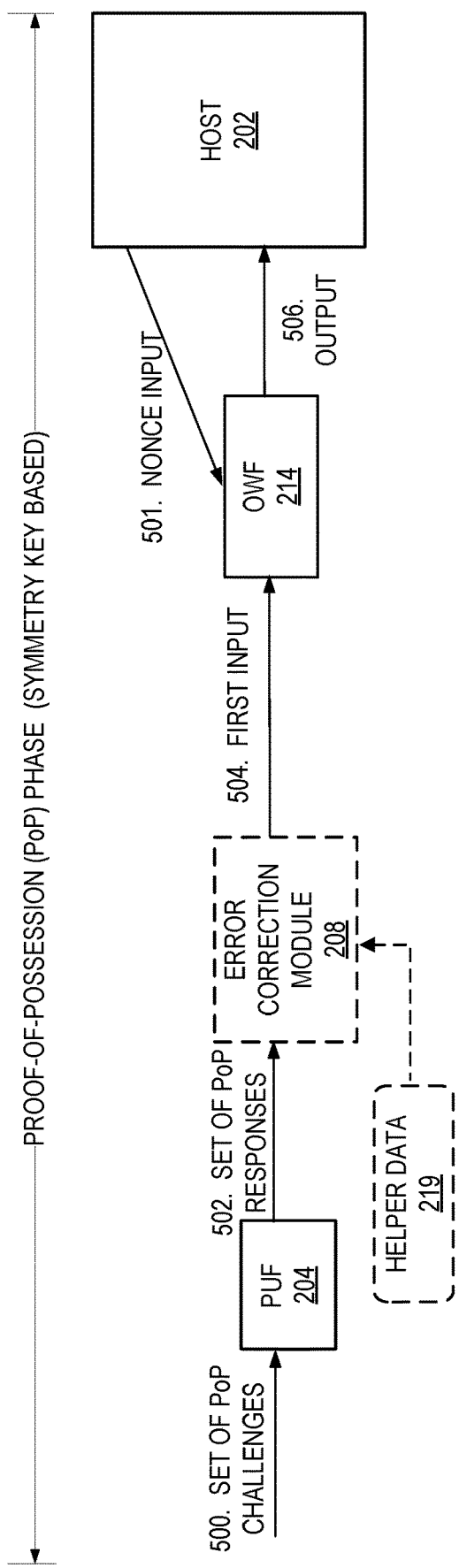
FIG. 5B is an illustration of the symmetric key based PoP operation performed by the SED during the PoP phase in accordance with one embodiment of the present disclosure.

FIG. 5B illustrates one example of generating an output in a symmetric key based PoP phase. The OWF 214 receives the output of the PUF 204 as the "first PoP input" (step 504) and also receives the "nonce input" from the host 202 (step 501). Then, the OWF 214 provides its output to the host 202 for PoP (step 506).

Figure 5C:
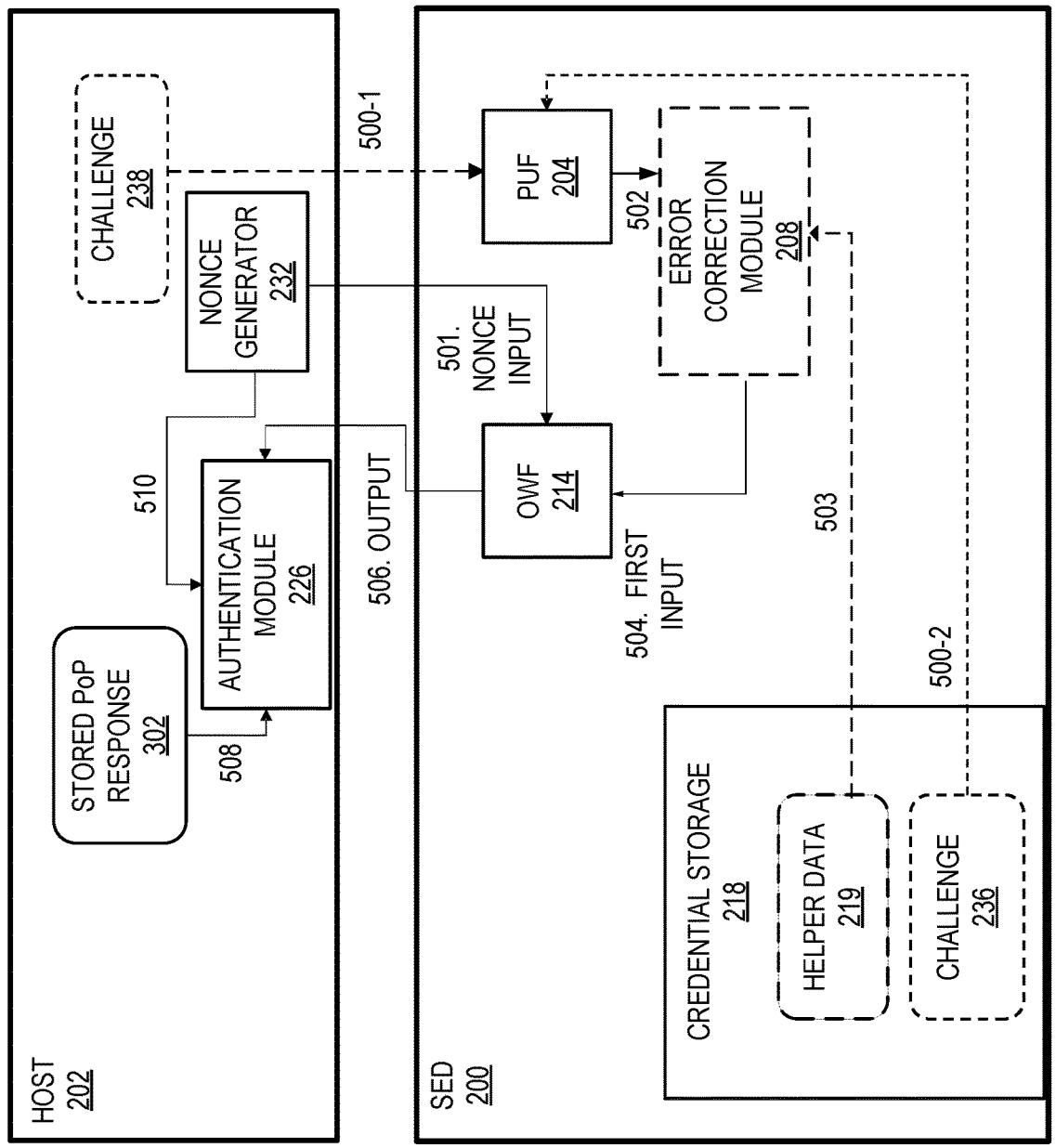
FIG. 5C illustrates the symmetric key based PoP operation of the SED and the host during the PoP phase in accordance with one embodiment of the present disclosure.

FIG. 5C illustrates one example of steps and components in the symmetric key based PoP phase.

Step 500: The host 202 supplies a set of PoP challenges ($chal_{PoP}$) to the PUF 204. Alternatively, a set of PoP challenges ($chal_{PoP}$) already stored on the SED 200 (e.g., stored during the registration phase) is used.

Step 501: The host 202 supplies a nonce (generated by the nonce generator 232) to the SED 200. The nonce does not necessarily have to be unpredictable but must not have been used previously.

Step 502: The PUF 204 generates a set of PoP responses that may contain errors compared to the response generated during the registration phase.

Steps 503, 504: Optionally, the previously generated helper data 219 is used to correct errors in the newly generated PoP response to reproduce the set of PoP responses. The error-corrected response and the nonce is supplied to the OWF 214 as the first PoP input.

Step 506: The output of the OWF 214 is supplied to the host 202.

By knowing the nonce and the stored set of PoP responses (step 508), the host 202 can calculate if the received output from the OWF 214 is legitimate. If so, the host 202 continues to the key generation phase. Otherwise, access is aborted.

Key Generation Phase

In the key generation phase, the SED 200 receives the external secret shares from the host 202 and, possibly, from the user. The external secret shares are inputted to the assembler 222. By using the same challenges ($chal_{DEK}$) used during the registration phase, the PUF 204 may regenerate the set of DEK responses, which are used as (1) the set of SED DEK secret shares (e.g. X- and Y-coordinates) or (2) the first set of partial SED DEK secret shares (e.g. X-coordinates) by the assembler 222, depending on the embodiment. The DEK responses may be noisy and therefore be error-corrected by using the helper data 219 prior to supplying them to the assembler 222.

Once t or more shares have been collected by the assembler 222, the secret DEK polynomial is reconstructed. As mentioned previously, the shares may be points on a polynomial curve over a finite field, and the master secret may be extracted from the equation of the secret DEK polynomial curve. The master secret which is output from the assembler 222 may e.g. be the coefficients of the curve, or the coordinates of a particular point on that curve, e.g., the constant $a_0$ given by $(x, y)=(0, a_0)$. The reconstructed secret is supplied to the KDF, which uses the reconstructed secret to construct a key having a certain size and possibly meeting a certain criterion. The generated key can be used to seamlessly decrypt the encrypted SED 200.

The present disclosure discusses the method of generating the key in the context of the SED 200. The method is, however, applicable for all types of encrypted storage devices and can easily be used by integrated components in phones and tablets (e.g. flash memories) as well as external USB-connected drives. By protecting the communication channel between the host 202 and the SED 200, e.g. by asymmetric cryptography, the method can also be used for cloud-based storage devices. It is also possible for a storage device to distribute shares to several different hosts. By doing so, a portable storage device may be decrypted by several different hosts.

Figure 6A:
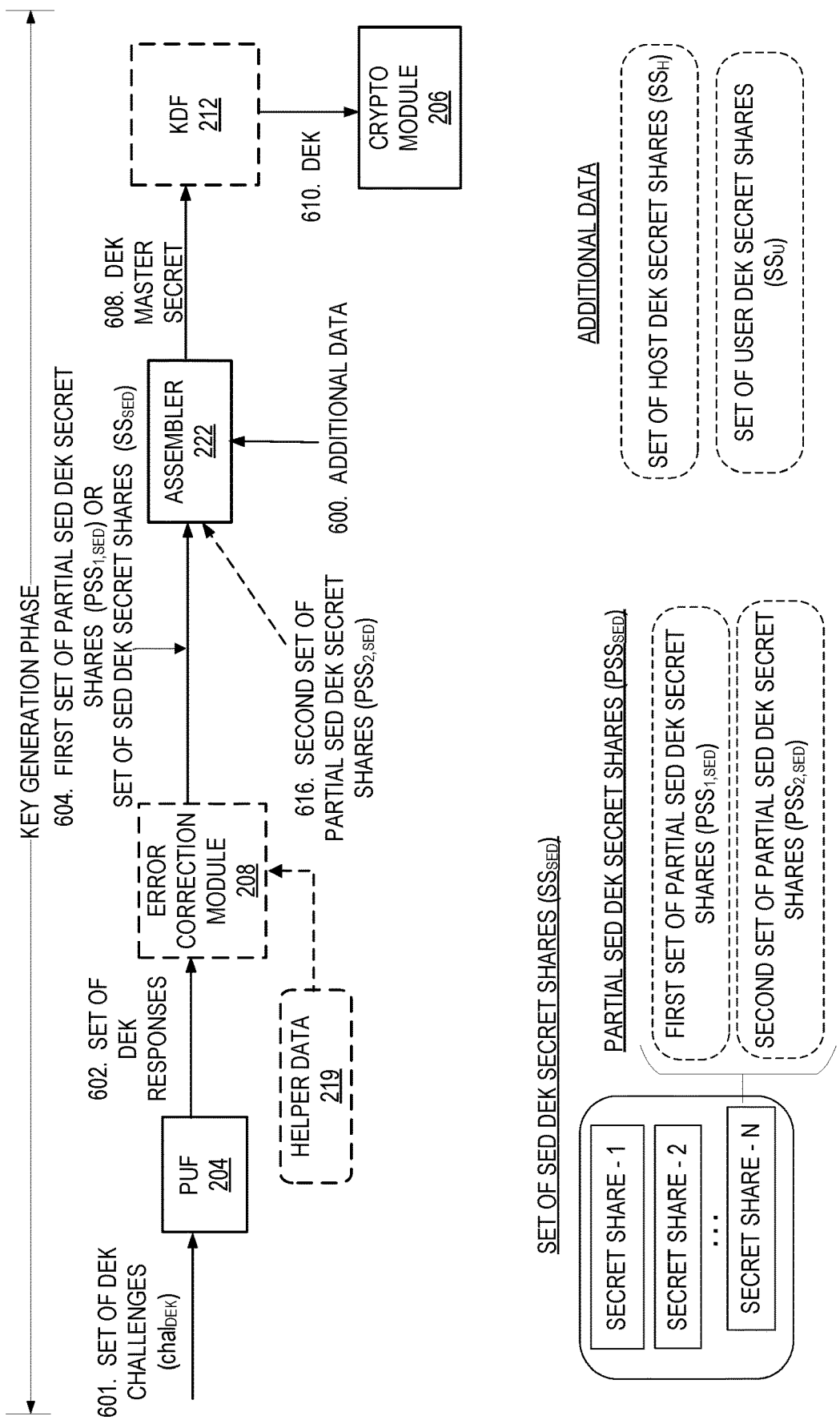
FIG. 6A is an illustration of a key generation phase of the PUF based secret sharing scheme during which the SED obtains a Data Encryption Key (DEK) in accordance with one embodiment of the present disclosure.

FIG. 6A illustrates one example of generating a master secret and a DEK in the key generation phase. The PUF 204 generates the set of DEK responses based on the set of DEK challenges ($chal_{DEK}$) (step 602). Optionally, the set of DEK responses may be error-corrected by the error correction module 208 based on the helper data 219. The assembler 222 receives the (error-corrected) set of DEK responses and use as the set of SED DEK secret shares ($SS_{SED}$) and/or the first set of partial SED DEK secret shares ($PSS_{1,SED}$) (step 604). The set of SED DEK secret shares ($SS_{SED}$) may include one or more of secret shares (secret share-1, secret share-2, . . . , secret share-N). At least one of the secret shares may comprise a set of partial SED DEK secret shares ($PSS_{SED}$), which may include a first set of partial SED DEK secret shares ($PSS_{1,SED}$) and a second set of partial SED DEK secret shares ($PSS_{2,SED}$).

In the case where the first set of partial SED DEK secret shares is used by the assembler 222, the first set of partial SED DEK secret shares (e.g. X-coordinates) is combined with the corresponding second set of partial SED DEK secret shares (e.g. Y-coordinates), thus the set of SED DEK secret shares is recreated. The second set of partial SED DEK secret shares was stored during the registration phase. The set of SED DEK secret shares may be further combined with the external secret shares ("additional data") and thus, the DEK master secret is recreated. In the case where the set of SED DEK secret shares (e.g. X- and Y-coordinates) is used by the assembler 222, the set of SED DEK secret shares may be further combined with the additional data and thus, the DEK master secret is recreated.

By assembling the set of SED DEK secret shares ($SS_{SED}$) and the additional data, the assembler 222 generates the DEK master secret (step 608). The additional data may comprise the set of host DEK secret shares ($SS_H$) and/or the set of user DEK secret shares ($SS_U$), which were prepared and stored in the host 202 during the registration phase. In one embodiment, the generated DEK master secret may be forwarded as a DEK to the crypto module 206 (step 610). Optionally, the generated DEK master secret is forwarded to the KDF 212 and is transformed by the KDF 212 to the DEK (step 608).

Figure 6B:
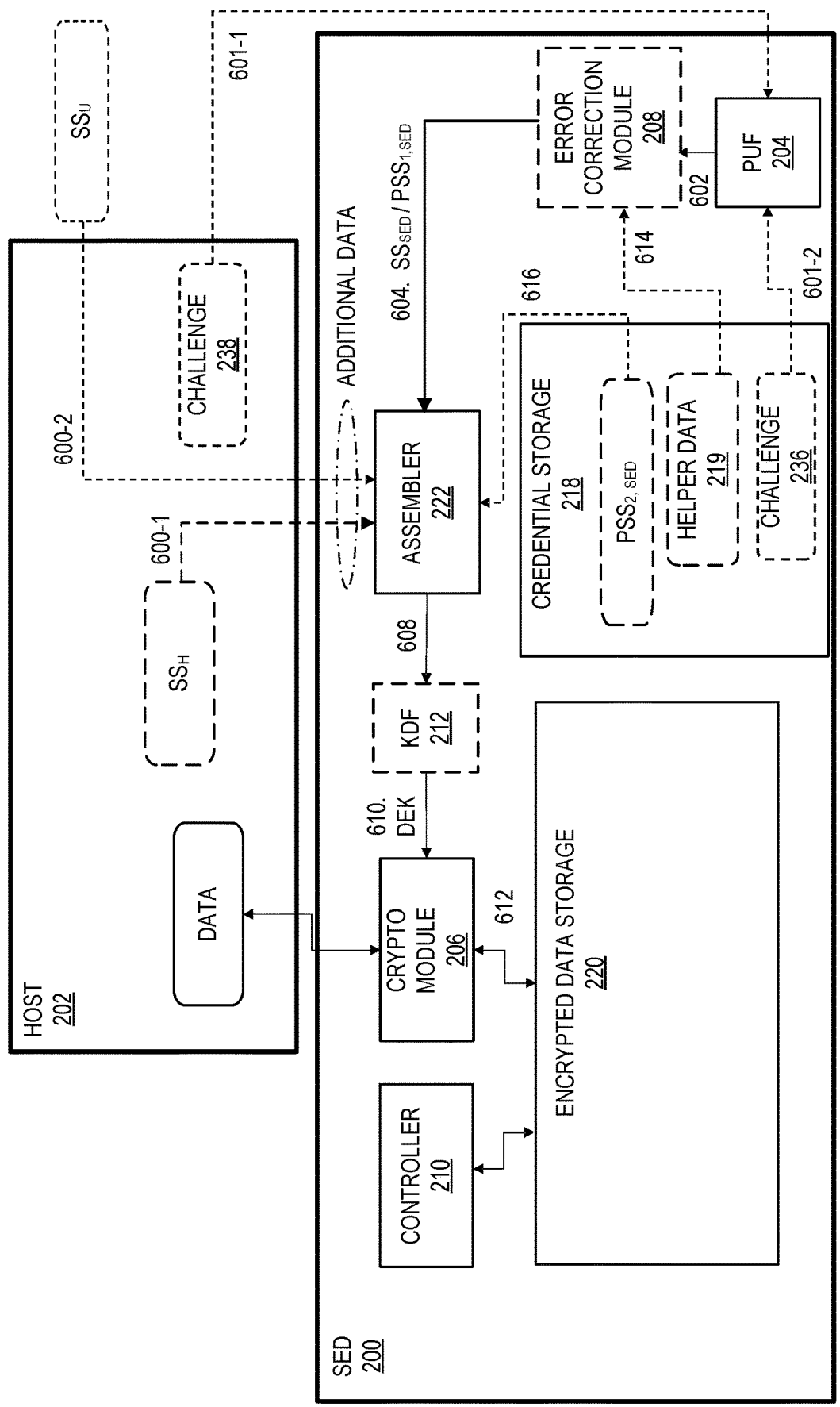
FIG. 6B illustrates the operation of the SED and the host during the key generation phase in accordance with one embodiment of the present disclosure.

FIG. 6B illustrates the first example of steps and components in the key generation phase.

Step 600: Once the SED 200 has shown PoP, the host 202 supplies the set of host DEK secret shares ($SS_H$), and the user may, optionally, supply the set of user DEK secret shares ($SS_U$) to the SED 200.

Step 601: The SED 200 supplies the set of DEK challenges ($chal_{DEK}$) to the PUF 204 to be used when reconstructing the secret DEK polynomial on the SED 200. Alternatively, the host may supply the challenges.

Step 602: The PUF 204 generates the set of DEK responses corresponding to the set of DEK challenges ($chal_{DEK}$), used to create the set of SED DEK secret shares ($SS_{SED}$) or the first set of partial SED DEK secret shares ($PSS_{1,SED}$).

Step 604: The generated set of DEK responses may contain errors compared to the responses generated during the registration phase. The previously generated helper data 219 is used to correct the errors of the newly generated DEK responses to reproduce the set of SED DEK secret shares ($SS_{SED}$) or the first set of partial SED DEK secret shares ($PSS_{1,SED}$) generated in the registration phase. The (error-corrected) set of SED DEK secret shares ($SS_{SED}$) or the first set of partial SED DEK secret shares ($PSS_{1,SED}$) is supplied to the assembler 222.

Step 616: Optionally, in the case where the DEK responses are used by the assembler 222 as the first set of partial SED DEK secret shares ($PSS_{1,SED}$), the second set of partial SED DEK secret shares ($PSS_{2,SED}$) is read from the credential storage 218 and is supplied to the assembler 222. The assembler 222 then combines the first set of partial SED DEK secret shares ($PSS_{1,SED}$) and the second set of partial SED DEK secret shares ($PSS_{2,SED}$) to form complete secret shares. Optionally, the assembler 222 further receives the additional data (the set of host DEK secret shares ($SS_H$) or the set of user DEK secret shares ($SS_U$)) from the host 202. Based on the complete shares and, optionally, the additional data, the assembler 222 uses Lagrange Interpolation to recreate the DEK master secret (e.g., extracted from the secret DEK polynomial). In the case where the DEK responses are used by the assembler 222 as the set of SED DEK secret shares ($SS_{SED}$), the assembler may combine the set of SED DEK secret shares ($SS_{SED}$) and the additional data and uses Lagrange Interpolation to recreate the DEK master secret (e.g., extracted from the secret DEK polynomial).

Step 608: The assembler 222 forwards the DEK master secret (e.g. the coefficients of the curve or specific y-coordinate(s) for pre-defined x-coordinate(s) on the curve) to the crypto module 206. Optionally, the DEK master secret is supplied to the KDF 212. If specific x-coordinates are used, the same equation may generate several different keys.

Step 610: Optionally, the KDF 212 creates a DEK based on the DEK master secret and provides the DEK to the crypto module 206.

Step 612: When the host 202 requests writing of incoming data, the incoming data is encrypted with the DEK by the crypto module 206 prior to storing the data on the SED 200. When the host 202 requests reading of outgoing data, the outgoing data is decrypted with the DEK by the crypto module 206 prior to supplying the data to the host.

Alternative Embodiments

The present disclosure is not limited to use a particular secret sharing scheme. The present disclosure may utilize any (t, n)-scheme. In some embodiments, Blakley's secret sharing scheme is used instead of Shamir's secret sharing scheme.

In some embodiments, a multi-layer secret sharing scheme (e.g. hierarchical and grouped secret sharing) is used, where the secret derived from one layer constitutes one new share on the next layer. For instance, when shares are classified into classes or groups, and there are requirements that participants from all groups participate in the unlocking of the secret. An example of implementation of the multi-layer secret sharing scheme is given below:

Layer 2:
  User group: a ($t_u$, $n_u$) is defined for $\underline{n_u}$ users. The users can jointly derive a secret share denoted by $\underline{s_u}$.
  Host group: a ($t_h$, $n_h$) is defined for $\underline{n_h}$ hosts. The hosts can jointly derive a secret share denoted by $\underline{s_h}$.
  Storage device: stored secret share $\underline{s_{SED}}$ directly.

Layer 1:
  A (3,3) secret sharing scheme where all shares {$s_u$, $s_h$, $s_{SED}$} are required to reconstruct the secret polynomial and consequently the DEK.
  The reconstructed DEK is used for encryption/decryption of the storage device.

Figure 7:
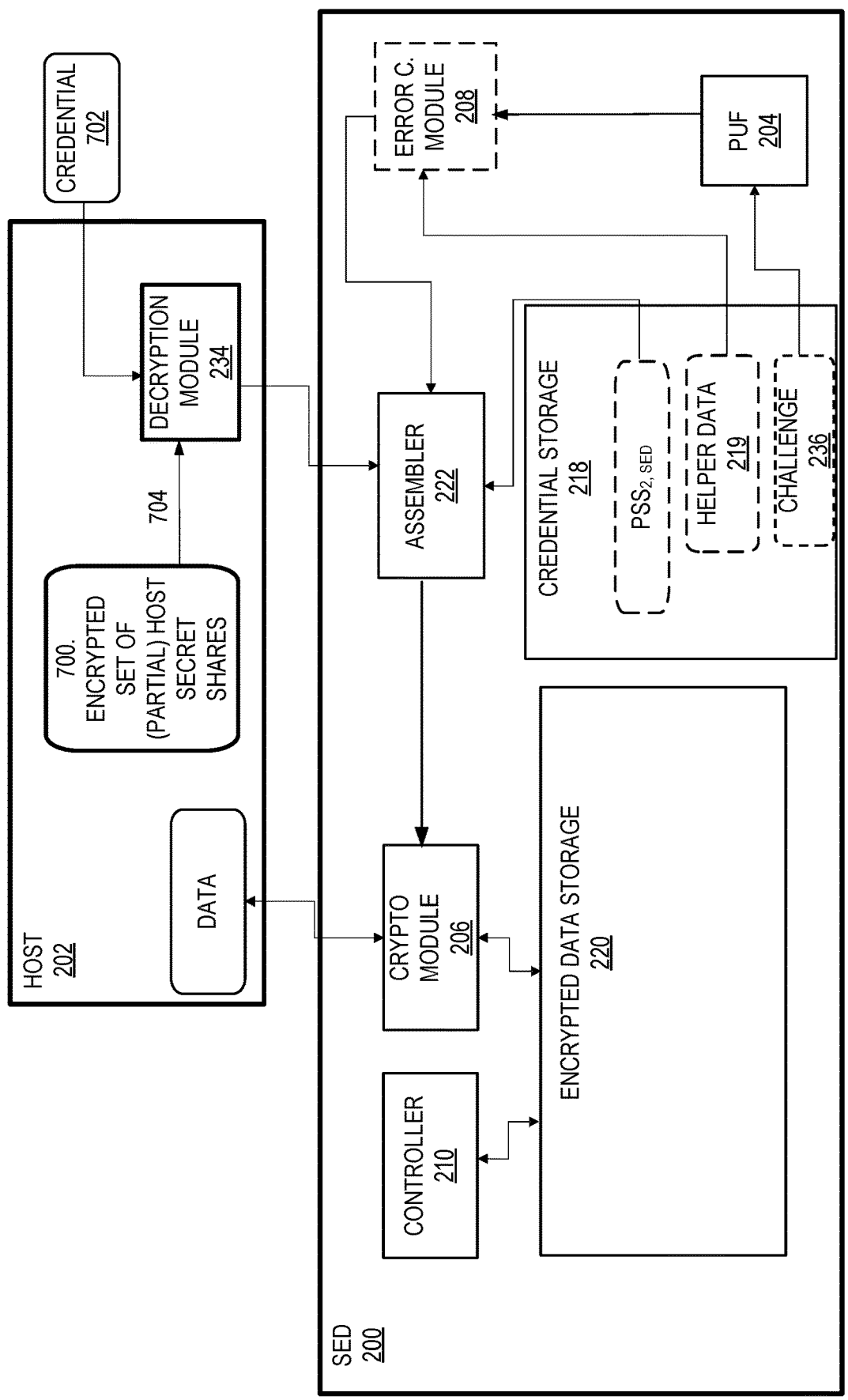
FIG. 7 illustrates the operation of the SED and the host during the key generation phase in accordance with another embodiment of the present disclosure.

FIG. 7 illustrates a second example (encrypted shares) of steps and components in the key generation phase. In one embodiment, the shares are not stored in cleartext nor generated on demand. Instead, they are encrypted until they are needed. For example, the host 202 may have its share encrypted by the user credential, as illustrated in FIG. 7 ("700. encrypted set of (partial) host secret shares"). That is, only when the correct user credential 702 is given, the host share is decrypted, for example, by the decryption module 234 (step 704). This can be an alternative to require participation from both the host and the user but without requiring both entities to store shares. The SED 200 may also store encrypted (partial) secrets shares instead of generating them directly from the PUF 204. In this scenario, the PUF responses may instead be used to encrypt/decrypt the secrets. This gives increased security compared to storing the DEK in encrypted form as an attacker must break all partial secrets on the SED 200 and steal the host secret to recreate the key.

Figure 8:
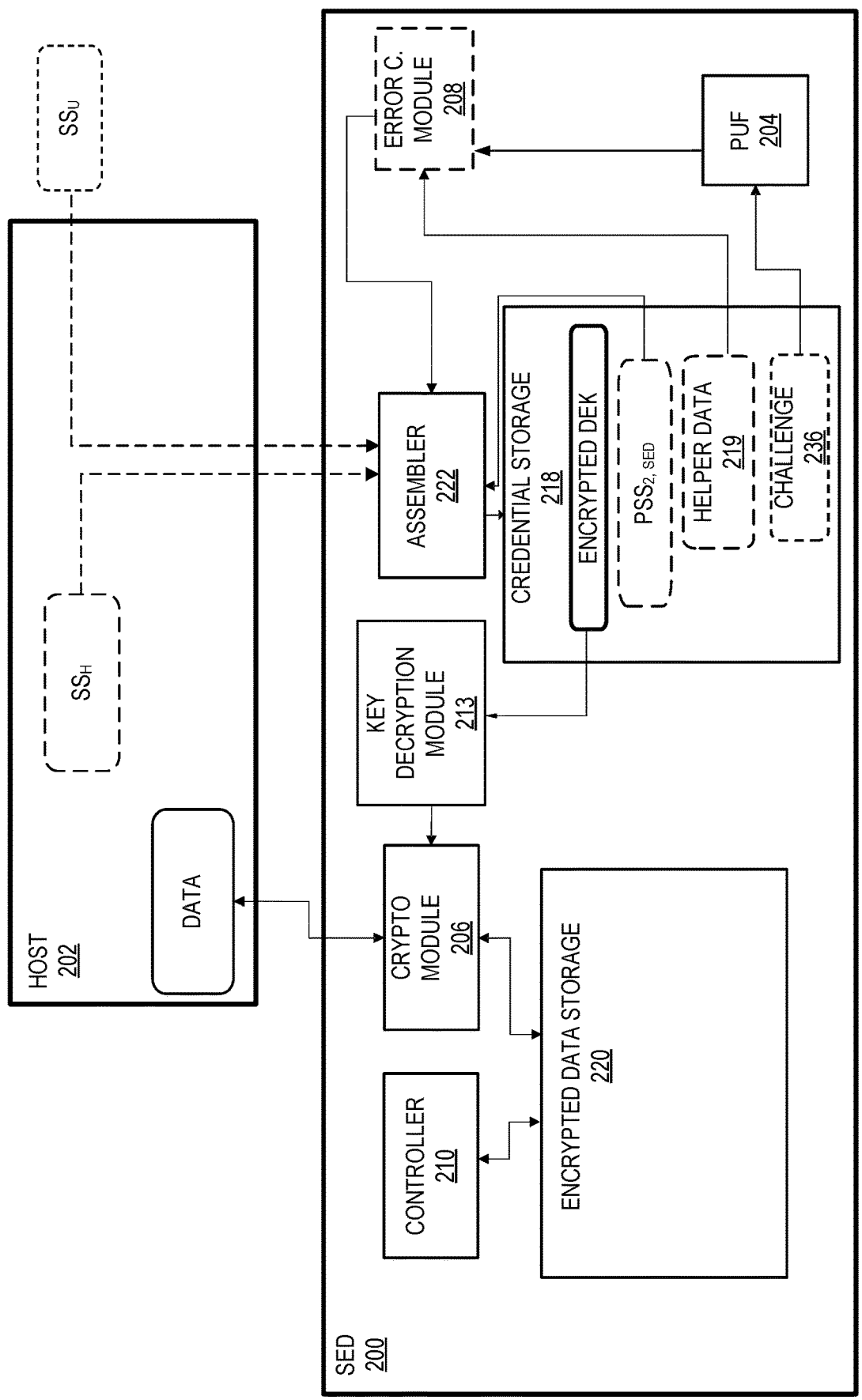
FIG. 8 illustrates the operation of the SED and the host during the key generation phase in accordance with yet another embodiment of the present disclosure.

FIG. 8 illustrates a third example (decryption of encrypted DEK using master secret) of steps and components in the key generation phase. In one embodiment, the output of the assembler 222 is not used to generate a DEK. Instead, the output can be used to decrypt an encrypted DEK stored on the credential storage 218. Several DEKs may be encrypted by using the same secret. The DEKs may still have different encryption keys, e.g., generated by using different points on a certain polynomial curve to decrypt each key.

In one embodiment, the host 202 acts as a "dealer" not only in the PoP phase but also in the registration phase. In other words, the host 202 creates the secret DEK polynomial, which is to be recreated during the key generation phase. The process of this embodiment is same as that in the registration phase, which is described above with respect to FIG. 3A and FIG. 3B, except the following differences: The host 202 generates its own share and any user's shares; the SED shares are created after the secret DEK polynomial has been supplied to the SED 200.

The key generation phase is the same as in FIG. 6A and FIG. 6B.

Figure 9:
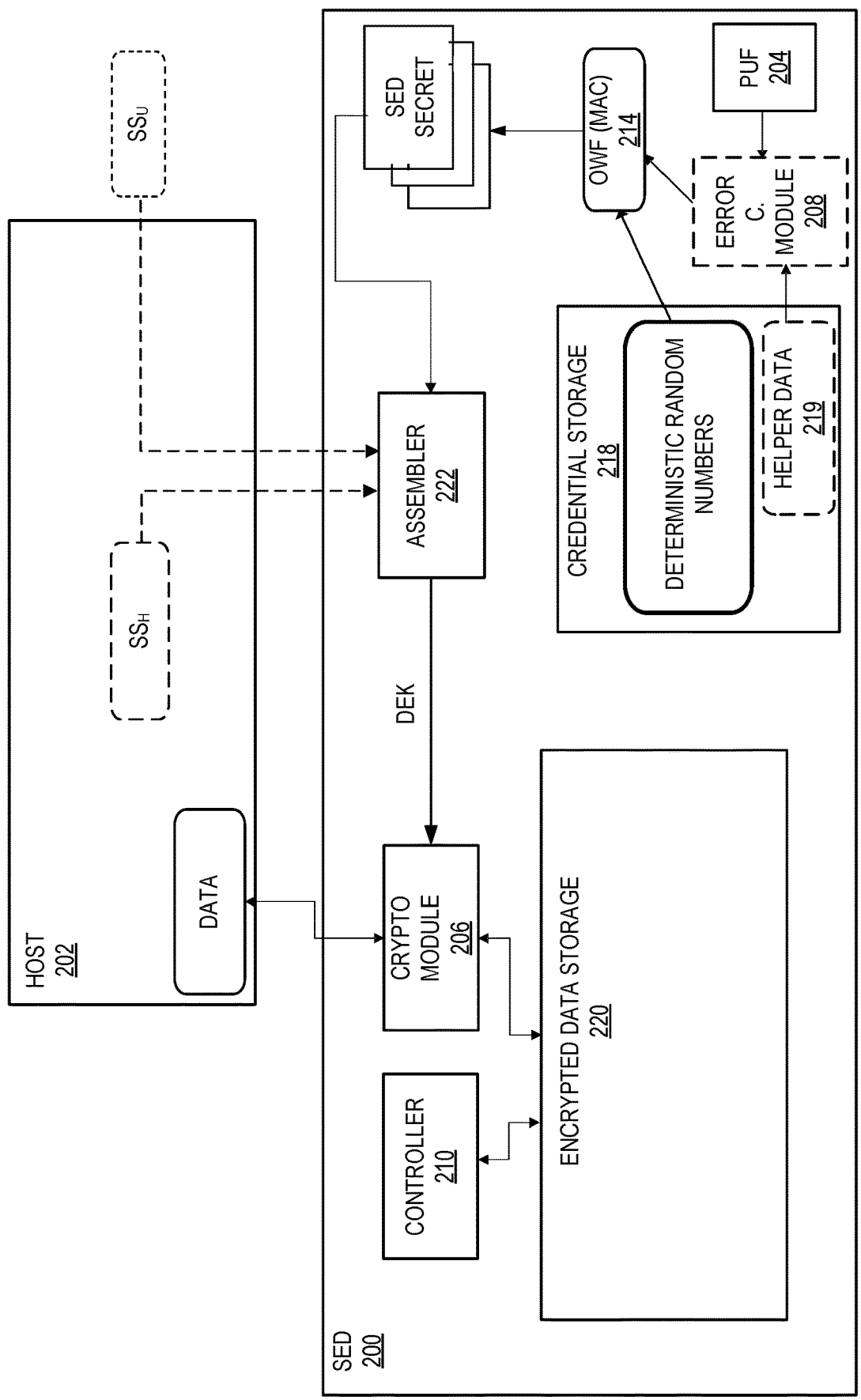
FIG. 9 illustrates the operation of the SED and the host during the key generation phase in accordance with yet another embodiment of the present disclosure in which the PUF is complemented by a Message Authentication Function (MAC).

FIG. 9 illustrates a fourth example (complementing PUF 204) of steps and components in the key generation phase. In one embodiment, the PUF 204 is complemented by a keyed Message Authentication Code (MAC), which has a device-unique parameter as a key. The device-unique parameter can be generated by the PUF 204, making each MAC responding differently to the same input. In this case, the PUF 204 only needs a single challenge-response pair, which is used as device-unique parameter. To generate the set of secret shares, a set of deterministic random numbers can be used as input to the MAC. The set of deterministic random numbers is analogue to the set of DEK challenges used in the other embodiments, for example, illustrated in FIG. 6A and FIG. 6B. Several different MAC types are suitable for this purpose, for example, Hash-Based Message Authentication Code Secure Hash Algorithm (HMAC-SHA) 2, HMAC-SHA 3, Universal Message Authentication Code (UMAC), VMAC and Poly1305-AES. The keyed MAC has the same properties as a PUF as it is a device-unique one-way function. In one embodiment, the MAC is replaced with a Pseudo Random Number Generator (PRNG). The PRNG produces seemingly random but deterministic output defined by a seed. In this embodiment the PUF response is used to seed the PRNG; the PRNG only takes the seed as an input and does not need challenges nor random numbers to produce an output. The output of the PRNG can be utilized to create the sets of (partial) secret shares used by the storage device, such as $SS_{SED}$, $PSS_{1,SED}$, $SS_{PoP,SED}$, and/or $PSS_{PoP,SED}$.

In one embodiment, asymmetric cryptography is used to prove PoP by creating a private-public key pair where the private key is generated by a PUF. During the registration phase, the public key is supplied to the host. During the PoP phase, the host 202 supplies a message to the SED 200, e.g. a nonce, which should be signed by the SED's private key. PoP is proven if a valid signed message is supplied by the SED 200.

While processes in the figures may show a particular order of operations performed by certain embodiments of the present disclosure, it should be understood that such order is exemplary (e.g., alternative embodiments may perform the operations in a different order, combine certain operations, overlap certain operations, etc.).

At least some of the following abbreviations may be used in this disclosure. If there is an inconsistency between abbreviations, preference should be given to how it is used above. If listed multiple times below, the first listing should be preferred over any subsequent listing(s).

AES Advanced Encryption Standard
AK Authentication Key
ATA Advanced Technology Attachment
BBRAM Battery Backup Random Access Memory
CPU Central Processing Unit
DMA Direct Memory Access
DEK Data Encryption Key
FDE Full Disk Encryption
FIB Focused Ion Beams
HMAC Hash-based Message Authentication Code
KDF Key Derivation Function
KEK Key Encryption Key
LRW Liskov, Rivest, and Wagner
MAC Message Authentication Code
MEK Media Encryption Key
MPC Multi Party Computation
Nonce Number used once
OTP One-Time Programmable memory
OWF One-Way Function
PBKDF2 Password-Based Key Derivation Function 2
PoP Proof-of-Possession
PUF Physically Unclonable Function
RAM Random-Access Memory
SED Self-Encrypting Drive
SHA Secure Hash Algorithm
SRAM Static Random Access Memory
SSD Solid-State Drive
TGC Trusted Computing Group
UMAC Universal Message Authentication Code
USB Universal Serial Bus
XOR Exclusive OR
XTS XOR-encrypt-XOR Tweaked-codebook mode with ciphertext Stealing Those skilled in the art will recognize improvements and modifications to the embodiments of the present disclosure. All such improvements and modifications are considered within the scope of the concepts disclosed herein.

The invention claimed is:

1. A method for protecting data in a storage device, the method comprising, during a key generation phase of operation:
generating, by at least one Physically Unclonable Function (PUF), a set of Data Encryption Key (DEK) responses based on a set of DEK challenges;
obtaining a set of Self-Encrypting Drive (SED) DEK secret shares based on the set of DEK responses;
obtaining additional data;
assembling at least the set of SED DEK secret shares and the additional data to create a DEK master secret;
obtaining a DEK based on the DEK master secret; and
performing at least one of encryption of data to be stored in encrypted data storage of the storage device using the DEK or decryption of data being accessed by a host from the encrypted data storage of the storage device using the DEK master secret.

2. The method of claim 1, further comprising, during the key generation phase of operation, generating the DEK based on the DEK master secret using a Key Derivation Function (KDF).

3. The method of claim 1, wherein at least one of the secret shares in the set of SED DEK secret shares comprises a set of partial SED DEK secret shares.

4. The method of claim 1, wherein the additional data comprises at least one of a set of host DEK secret shares belonging to the host or a set of user DEK secret shares belonging to a user.

5. The method of claim 1, further comprising, during a proof-of-possession (POP) phase of operation that is prior to the key generation phase of operation:
generating, by at least one PUF, a set of POP responses based on a set of POP challenges;
receiving first PoP data from the host;
assembling the first POP data with second POP data that is based on the set of PoP responses to create a PoP master secret; and
forwarding the POP master secret to an authentication module of the host.

6. The method of claim 5, wherein the first POP data comprises at least one of a set of host PoP secret shares or a set of partial host POP secret shares, and the second PoP data comprises at least one of a set of SED POP secret shares or a set of partial SED POP secret shares.

7. The method of claim 1, further comprising:
obtaining, by a One-Way Function (OWF), a first input that is based on:
a set of POP responses generated by the at least one PUF based on a set of POP challenges, and
a nonce input from the host;
generating an output based on the first input and the nonce input; and
forwarding the output to the host.

8. The method of claim 1, further comprising:
obtaining at least one of a set of SED POP secret shares or a set of partial SED PoP secret shares based on a set of POP responses of the at least one PUF; and
providing the at least one of the set of SED POP secret shares or the set of partial SED POP secret shares to the host.

9. The method of claim 1, wherein the additional data comprises at least a set of host DEK secret shares, and the method further comprising providing the set of host DEK secret shares to the host.

10. The method of claim 1, wherein the additional data comprises at least a set of user DEK secret shares, and the method further comprising providing the set of user DEK secret shares to a user.

11. A storage device for protecting data, the storage device comprising:
one or more processors;
one or more memories storing instructions which, when executed by the one or more processors, cause during a key generation phase of operation:
generating, by at least one Physically Unclonable Function (PUF) of the storage device, a set of Data Encryption Key (DEK) responses based on a set of DEK challenges;
obtaining, by an assembler of the storage device, a set of Self-Encrypting Drive (SED) DEK secret shares based on the set of DEK responses;
obtaining, by the assembler, additional data;
assembling, by the assembler, at least the set of SED DEK secret shares and the additional data to create a DEK master secret;
obtaining, by a crypto module of the storage device, a DEK based on the DEK master secret; and
performing, by the crypto module, at least one of encryption of data to be stored in encrypted data storage of the storage device using the DEK or decryption of data being accessed by a host from the encrypted data storage of the storage device using the DEK master secret.

12. The storage device of claim 11, wherein the instructions further cause, during the key generation phase of operation, generating the DEK based on the DEK master secret using a Key Derivation Function (KDF).

13. The storage device of claim 11, wherein at least one of the secret shares in the set of SED DEK secret shares comprises a set of partial SED DEK secret shares.

14. The storage device of claim 11, wherein the additional data comprises at least one of a set of host DEK secret shares belonging to the host or a set of user DEK secret shares belonging to a user.

15. The storage device of claim 11, wherein the instructions further cause, during a proof-of-possession (POP) phase of operation that is prior to the key generation phase of operation:
generating, by at least one PUF, a set of PoP responses based on a set of POP challenges;
receiving first PoP data from the host;
assembling the first POP data with second POP data that is based on the set of PoP responses to create a POP master secret; and
forwarding the POP master secret to an authentication module of the host.

16. The storage device of claim 15, wherein the first PoP data comprises at least one of a set of host PoP secret shares or a set of partial host PoP secret shares, and the second POP data comprises at least one of a set of SED POP secret shares or a set of partial SED POP secret shares.

17. The storage device of claim 11, wherein the instructions further cause:
obtaining, by a One-Way Function (OWF), a first input that is based on:
a set of POP responses generated by the at least one PUF based on a set of POP challenges, and
a nonce input from the host;
generating an output based on the first input and the nonce input; and
forwarding the output to the host.

18. The storage device of claim 11, wherein the instructions further cause:
obtaining at least one of a set of SED POP secret shares or a set of partial SED PoP secret shares based on a set of POP responses of the at least one PUF; and
providing the at least one of the set of SED POP secret shares or the set of partial SED POP secret shares to the host.

19. The storage device of claim 11, wherein the additional data comprises at least a set of host DEK secret shares, and wherein the instructions further cause, providing the set of host DEK secret shares to the host.

20. The storage device of claim 11, wherein the additional data comprises at least a set of user DEK secret shares, and wherein the instructions further cause, providing the set of user DEK secret shares to a user.

* * * * *